US009521101B2

(12) United States Patent
Shmarovoz et al.

(10) Patent No.: US 9,521,101 B2
(45) Date of Patent: *Dec. 13, 2016

(54) METHOD OF AND SYSTEM FOR REFORMATTING AN E-MAIL MESSAGE BASED ON A CATEGORIZATION THEREOF

(71) Applicant: YANDEX EUROPE AG, Lucerne (CH)

(72) Inventors: Georgii Valentinovich Shmarovoz, Moscow region (RU); Alexander Viktorovich Kozlov, Moscow (RU); Anna Aleksandrovna Demyanenko, Rostov-on-Don (RU); Iulia Nikolaevna Latysheva, Moscow (RU); Egor Vladimirovich Ganin, Shishkin Les (RU)

(73) Assignee: YANDEX EUROPE AG, Lucerne (CH)

( * ) Notice: Subject to any disclaimer, the term of this patent is extended or adjusted under 35 U.S.C. 154(b) by 299 days.

This patent is subject to a terminal disclaimer.

(21) Appl. No.: 14/302,731

(22) Filed: Jun. 12, 2014

(65) Prior Publication Data

US 2015/0100649 A1 Apr. 9, 2015

(30) Foreign Application Priority Data

Oct. 3, 2013 (RU) ................................ 2013144681

(51) Int. Cl.
*G06F 15/16* (2006.01)
*H04L 12/58* (2006.01)
(Continued)

(52) U.S. Cl.
CPC ......... *H04L 51/22* (2013.01); *G06F 17/30598* (2013.01); *G06F 17/30705* (2013.01);
(Continued)

(58) Field of Classification Search
None
See application file for complete search history.

(56) References Cited

U.S. PATENT DOCUMENTS 7,849,213 B1 12/2010 Borghetti
7,908,329 B2 * 3/2011 Tsang .................. G06Q 10/107
709/206

(Continued)

FOREIGN PATENT DOCUMENTS

RU 2364921 C2 7/2004
WO 2004061698 A 7/2004
(Continued)

OTHER PUBLICATIONS

International Search Report from PCT/IB2014/062982; Jan. 6, 2015; Blaine R. Copenheaver.

(Continued)

*Primary Examiner* — Brian P Whipple
(74) *Attorney, Agent, or Firm* — BCF LLP

(57) ABSTRACT

There is provided a method of reformatting an e-mail message having a header and a body having content in a received format. The method comprises receiving, by at least one server via a communications network, the e-mail message; saving, by the at least one server, the e-mail message in a database in communication with the at least one server; receiving, by the at least one server from a client device, a request to retrieve the e-mail message; retrieving, by the at least one server, the e-mail message from at least one database; determining, by the at least one server, a classification of the e-mail message from the at least one database, the classification including a sender type and at least one message type; and reformatting at least some of the content of the body of the message into a predetermined format associated with the determined classification of the (Continued)

e-mail message; and sending, by the at least one server to the client device, at least some of the reformatted content of the body of the message.

48 Claims, 5 Drawing Sheets

(51) Int. Cl.
 *G06F 17/30* (2006.01)
 *H04L 29/06* (2006.01)
 *G06Q 10/10* (2012.01)
(52) U.S. Cl.
 CPC ..... *G06F 17/30861* (2013.01); *G06Q 10/107* (2013.01); *H04L 51/046* (2013.01); *H04L 51/12* (2013.01); *H04L 67/42* (2013.01)

(56) References Cited

U.S. PATENT DOCUMENTS

| | | |
|---|---|---|
| 8,095,602 B1 | 1/2012 | Orbach |
| 8,244,814 B1 * | 8/2012 | Brown .................. H04L 51/08 370/242 |
| 2004/0260776 A1 | 12/2004 | Starbuck et al. |
| 2005/0076240 A1 | 4/2005 | Appleman |
| 2006/0031373 A1 | 2/2006 | Werner et al. |
| 2009/0113003 A1 | 4/2009 | Lu et al. |
| 2009/0327430 A1 | 12/2009 | Colvin et al. |
| 2011/0264585 A1 | 10/2011 | Abdulhayoglu |
| 2012/0131107 A1 | 5/2012 | Yost |
| 2013/0254311 A1 | 9/2013 | Ganin et al. |
| 2014/0020045 A1 | 1/2014 | Kabat et al. |
| 2015/0052032 A1 * | 2/2015 | Aharoni ................. G06Q 10/00 705/30 |
| 2015/0295876 A1 * | 10/2015 | Newman .............. G06Q 10/107 709/206 |

FOREIGN PATENT DOCUMENTS

| | | |
|---|---|---|
| WO | 2005089167 A2 | 9/2005 |
| WO | 2012049681 A2 | 4/2012 |
| WO | 2015049596 A1 | 4/2015 |

OTHER PUBLICATIONS

U.S. Appl. No. 14/302,715, filed Jun. 12, 2014.
U.S. Appl. No. 14/302,731, filed Jun. 12, 2014.
U.S. Appl. No. 14/302,759, filed Jun. 12, 2014.
U.S. Appl. No. 14/302,783, filed Jun. 12, 2014.
U.S. Appl. No. 14/302,795, filed Jun. 12, 2014.
U.S. Appl. No. 14/302,809, filed Jun. 12, 2014.

* cited by examiner

METHOD OF AND SYSTEM FOR REFORMATTING AN E-MAIL MESSAGE BASED ON A CATEGORIZATION THEREOF

CROSS-REFERENCE

The present patent application claims the benefit of the conventional priority to the previously filed utility model application entitled "METHOD OF AND SYSTEM FOR PROCESSING AN E-MAIL MESSAGE TO DETERMINE A CATEGORIZATION THEREOF", filed with the Russian Patent Office on Oct. 3, 2013 and bearing an application number 2013144681.

FIELD

The present technology relates to methods of and systems for processing e-mail messages.

BACKGROUND

The use of e-mail as a means of communication has become very common. Indeed, in many situations, e-mail has replaced the standard post letter, the telephone and the facsimile as the preferred means of communication. This has lead to increases in the volume of e-mail being sent and received; so much so that in many cases people find it difficult to manage their e-mail messages leading to the undesirable situation that some e-mail messages may not be timely dealt with or may not be dealt with at all.

Conventional e-mail clients typically provide users with one or more automated means of assisting them with managing their e-mail messages. Usually such tools are end-user-configured filters and rules that may, for example, affect which e-mail messages are displayed (in the case of a filter) and may automatically perform some action (in the case of a rule). While such filters/rules prove helpful in some circumstances, as e-mail management issues still persist notwithstanding their usage, improvement in this area might be beneficial.

SUMMARY

It is an object of the present technology to ameliorate at least some of the inconveniences present in the prior art.

By way of introduction, conventional e-mail is typically formatted for exchange over the Internet in the format defined in RFC 5322 (available at, for example, http://tools.ietf.org/html/rfc5322). In the Internet e-mail message format, an e-mail message consists of two basic sections, the header and the body. The header of the e-mail message is structured in various fields which contain information about the e-mail message. The body of the e-mail message contains the content of the e-mail message. Each of these will be discussed in turn.

Typical header fields include:

A "from" field identifying the sender of the e-mail message by Internet e-mail address and in most cases by name.

A "to" field identifying the recipient(s) of the e-mail message by Internet e-mail address and optionally by name.

A "cc" field identifying persons receiving a copy of the e-mail message by Internet e-mail address and optionally by name.

A "bcc" field identifying persons receiving a blind copy of the e-mail message by Internet e-mail address and optionally by name.

A "subject" field typically providing a brief summary of the topic of the e-mail message.

A "date" field identifying the date and time that the e-mail message was sent (typically in the sender's local time and Greenwich Mean Time).

A "message-ID" field providing a unique character string in respect of the e-mail message.

This list is only intended as a brief summary of e-mail header fields typically found in most e-mail messages. It is not a complete list of all possible e-mail header fields. (See also RFC 5322 referred to above and RFC 3864, (available at, for example, http://tools.ietf.org/html/rfc3864)).

As was noted above, the body of the e-mail message includes the message's content. The content is typically either in plain text or HTML (Hypertext Markup Language) and is typically encoded using an encoding scheme such as ASCII or Unicode.

An e-mail message may have attachments (i.e. files) attached thereto.

The creators of the present technology theorize that some of the reasons why conventional e-mail filters and/or rules are not of more assistance in managing e-mail messages might be the following: In order for a conventional e-mail filter or rule to function the e-mail end user must know in advance what e-mails they will be receiving and must set up filters/rules accordingly for those e-mails. As can be appreciated, a person can receive a myriad of e-mails of different types, from different senders, requesting different information. It is virtually impossible for a person to know in advance all of the different e-mails that they will be receiving and therefore there is no way that every possible filter/rule necessary could be preprogrammed in advance of receiving an e-mail. Further, even when a person does know some of the e-mails that they will be receiving, it may be difficult (or impossible) to configure a filter or rule to target those particular e-mails as conventional e-mail clients apply filters and rules based solely on the information appearing in e-mail headers and that information may be insufficient to craft a filter and/or rule. Further, the implementation of filters and rules in many conventional e-mail clients tends to be complex and somewhat difficult for the average user and therefore most people tend not to use them.

In order to ameliorate this situation, the present technology has been created. The present technology is useful to automatically categorize (at least some) e-mail messages and to either take some action based on that categorization and/or to allow some action to be taken based on that categorization. In this respect, it is theorized that the vast majority of current non-junk e-mail messages can be divided into several broadly-defined types:

Messages from individuals.

Messages from services/commercial entities containing registration data or credentials (e.g. website login username and password information).

Messages from services/commercial entities containing ticketing (e.g. airline, train, bus, etc.), booking (e.g. hotels) or reservation (e.g. car rentals) information.

Messages from social networking services (e.g. Facebook™, Twitter™, Linked-In™ etc.).

Messages from services/commercial entities containing financial, accounting, invoicing, or billing information.

Messages from services/commercial entities containing personalized information.

Message from services/commercial entities containing non-personalized information, mass/bulk messages (e.g. advertising, general information, etc.)

Each of these types of e-mails can be categorized in the context of the present technology with a sender type and at least one message type. In some embodiments, for example, the plurality of potential sender types include individuals, social networks, discount services, financial institutions, airlines, hotels, railways, real estate services, classifieds, and e-mail systems. In some embodiments, the potential message types include notifications, bills, credentials, tickets, cancellations, personal, general, etc.

In some embodiments, at least in some cases, the determination of the at least one message type is based, at least in part, on the determination of the sender type. In some embodiments, at least in some cases, the determination of the at least one message type is independent of the determination of the sender type.

In some embodiments, in some cases, a message will have a single message type. In some embodiments in some cases, a message will have a plurality of message types.

Rather than rely solely on the end-user e-mail client for end-user e-mail management, in the present technology at least some (and in some embodiments the bulk, and in other embodiments the entirety) of the e-mail management functions are handled by the e-mail processing & delivery system itself (e.g. the "back end" servers that enable e-mail functioning). In particular, the determination of the type of an e-mail message (as described above, for example) can be carried out by the e-mail processing & delivery system, and that e-mail message may undergo differential or specialized processing as a result by either the e-mail processing & delivery system and/or the end-user e-mail client.

In some embodiments of the present technology, the e-mail processing system can further receive, from the user, an indication of the message type (or the sender type) associated with the given e-mail message. For example, is some embodiments, after the user is presented with an action based on the category of the e-mail (as will be described herein below), the e-mail processing system may appreciate a user indication of the message type (or the sender type), in case the user would prefer to have the given e-mail message categorized differently (and, thus, potentially be associated with a different action). The e-mail processing system can appreciate this user indication of the message type by means of the user selecting a check box, selecting the user indication from a drop down menu or any other convenient means.

Alternatively, the e-mail processing system may appreciate if the user inherently agrees or disagrees with the categorization of the e-mail message by observing of user-action (or lack thereof). For example, if the e-mail processing system offers the user a widget based on the categorization of the e-mail and the user actuates (or otherwise uses the widget), the e-mail processing system may determine that the user has inherently agreed with the categorization of the e-mail (and the proposed action). By the same token, if the user has consistently not used a particular suggested action (for example, after 3 presented particular suggested actions of the same type, after 10 presented particular suggested actions and the like), the e-mail processing system may determine that the user inherently disagrees with the categorization of the e-mail or the associated proposed action. Based on this feedback loop, the e-mail processing system may amend one or more routines for determining the categorization of the e-mail and/or the associated action.

Thus, in one aspect, implementations of the present technology provide a method of processing an e-mail message to determine a categorization thereof, the categorization including a sender type and a message type, the method comprising:

receiving an e-mail message by at least one server, the e-mail message including a header having a plurality of header fields and body having content;

if the e-mail message is not junk e-mail, determining, by the at least one server, the sender type of the e-mail message, the sender type being one from a plurality of potential sender types, via a first analysis of the header and the body, the first analysis including application of at least one first complex rule, each applied first complex rule including a plurality of elementary rules specific to that applied first complex rule, at least some of the plurality of elementary rules specific to that applied first complex rule including a regular expression analysis; and if the e-mail message is not junk e-mail, determining, by the at least one server, at least one message type of the e-mail message, a message type being one from a plurality of potential message types, via a second analysis of the header and the body, the second analysis including application of at least one second complex rule, each applied second complex rule including a plurality of elementary rules specific to that applied second complex rule, at least some of the second plurality of elementary rules specific to that applied second complex rule including a regular expression analysis.

In another aspect, embodiments of the invention provide a system for processing an e-mail message to determine a categorization thereof, the categorization including a sender type and a message type, the system including:

at least one server including a computer processor;

at least one database in electronic communication with the at least one server;

a non-transitory computer readable information storage medium in electronic communication with the at least one server containing program instructions that when executed by the computer processor effect:

receiving an e-mail message by at least one server, the e-mail message including a header having a plurality of header fields and body having content;

if the e-mail message is not junk e-mail, determining, by the at least one server, the sender type of the e-mail message, the sender type being one from a plurality of potential sender types, via a first analysis of the header and the body, the first analysis including application of at least one first complex rule, each applied first complex rule including a plurality of elementary rules specific to that applied first complex rule, at least some of the plurality of elementary rules specific to that applied first complex rule including a regular expression analysis; and if the e-mail message is not junk e-mail, determining, by the at least one server, at least one message type of the e-mail message, a message type being one from a plurality of potential message types, via a second analysis of the header and the body, the second analysis including application of at least one second complex rule, each applied second complex rule including a plurality of elementary rules specific to that applied second complex rule, at least some of the second plurality of elementary rules specific to that applied second complex rule including a regular expression analysis.

A regular expression is a sequence of characters that forms a search pattern. Almost any character can be included in the sequence, including letters, numbers, symbols, and/or a wildcard character such as "." (a period—signifying a match of a single character) or "*" (an asterisks—signifying a match of any number of characters). A common sequence of characters that may be a part of a regular expression might consist of a word or a part of a word. For example, a regular expression may be created to search for the string of characters "facebook".

In the context of the present specification, an elementary rule, when associated with a regular expression, determines the presence or absence of the sequence of characters forming the search string (of the regular expression) in a particular text to be searched. For example, a first elementary rule ("ER-1") might be: "Is the string of characters 'facebook' found in the body of an e-mail message?" A second elementary rule ("ER-2") might be "Is the string of characters 'facebook' found in the domain name of the e-mail address of the sender in the "from" field of the header of an e-mail message?" (It will be appreciated that the aforementioned elementary rules have been expressed in English as opposed to in a computer programming language, for ease of understanding. This will generally be the case in the present specification unless otherwise noted.)

In the context of the present specification, other types of elementary rules other than those associated with regular expressions may also be used (in addition to one or more elementary rules associated with regular expressions). For example, an elementary rule not associated with a regular expression might be "Is there more than one address in the To: field of the header?" or "Was the message sent between the hours of 1 am and 5 am?".

In the context of the present specification, a complex rule is a combination of two or more elementary and/or complex rules. There is no limit to number or type of elementary rules that can be employed in a complex rule. For example, a first complex rule ("CR-1") might be "Are both ER-1 and ER-2 true?" A first analysis determination based on the complex rule CR-1 might be, if CR-1 is true then the sender type of the e-mail could, for example be, "social network".

Continuing with this example:
A third elementary rule ("ER-3") might be "Does the Subject field of the header of the message contain the string of characters 'due' ?".
A fourth elementary rule ("ER-4") might be "Does the Subject field of the header of the message contain the string of characters 'invoice' ?".
A fifth elementary rule ("ER-5") might be "Does the Subject field of the header contain the string of characters 'bill' ?".
A sixth elementary rule ("ER-6") might be "Does the body of the message contain the string of characters 'due'?"
A seventh elementary rule ("ER-7") might be "Does the body of the message contain the string of characters 'invoice'?"
An eighth elementary rule ("ER-8") might be "Does the body of the message contain the string of characters 'bill'?"
A ninth elementary rule ("ER-9") might be "Does the message have an attachment?"
A tenth elementary rule ("ER-10") might be "Does the name of the attachment contain the string of characters 'due'?"
An eleventh elementary rule ("ER-11") might be "Does the name of the attachment contain the string of characters 'invoice'?"
A twelfth elementary rule ("ER-12") might be "Does the name of the attachment contain the string of characters 'bill'?"

A second complex rule ("CR-2") might be:
Is at least one of ER-3, ER-4, and ER-5 true? AND
Is at least one of ER-6, ER-7 and ER-8 true? AND
Is ER-9 true? AND
Is at least one of ER-10, ER-11 and ER-12 true?

A second analysis determination based on the complex rule CR-2 might be: if CR-2 is true (i.e. the answers to all four questions in CR-2 are 'yes') then a message type of the e-mail could, for example be, "bill".

The first analysis (to determine the sender type of a message) and the second analysis (to determine the message type(s)) may include any number and types of complex rules, elementary rules, and other sub-analyses as are necessary to make the determination in question.

Thus, in some embodiments, the first analysis and/or the second analysis include(s) a linguistic analysis to determine the presence or absence of certain expression(s) in the e-mail message.

In some embodiments, the first analysis and/or the second analysis include(s) analysis of a digital signature associated with the e-mail message. A digital signature is a mathematical scheme for demonstrating the authenticity of an e-mail message (or other document). A valid digital signature gives the recipient reason to believe that the e-mail message was created by a known sender, such that the sender cannot deny having sent the message (authentication and non-repudiation) and that the message was not altered in transit (integrity). Digital signatures are commonly used in cases where it is important to detect forgery or tampering.

In some embodiments, the first analysis and/or the second analysis include(s) analysis of an attachment associated with the e-mail message. In the respect, for example, the presence of an attachment of a large size would tend to indicate that the e-mail is specific to the recipient and is not a general e-mail that has been sent to a group of people. In another example, an attachment named "invoice.pdf" would provide one indication that a categorization of the e-mail message as a "message from a service/commercial entity containing financial, accounting, invoicing, or billing information" might be appropriate.

In some embodiments, the first analysis and/or the second analysis include(s) analysis of an image included in the body of the e-mail. Similar to what was discussed above, the presence of a large-sized image in the body of the e-mail message would provide an indication that the e-mail is specific to the recipient and is not a general e-mail that has been sent to a group of people. While the presence of many small images in the e-mail (along with pricing information) would provide an indication that the e-mail is advertising e-mail.

In some embodiments, the first analysis and/or the second analysis include(s) analysis of a link included in the body of the e-mail. In this respect, in particular, analysis of the domain name in the link included in the body of an e-mail may assist in the categorization thereof. For example, if the character string "air" where found in the domain name, this provides an indication that the categorization of the e-mail may be a "message from a service/commercial entity containing ticketing (e.g. airline, train, bus, etc.), booking (e.g. hotels) or reservation (e.g. car rentals) information".

In some embodiments, the method further comprises saving, by the at least one server, the determined sender type of the e-mail message, in a database in electronic communication with the at least one server; and saving, by the at least one server, the determined at least one message type of the e-mail message in the database. Typically the saving of the determined sender type and the determined message type(s) in a database will be the case, allowing for this information to be used and/or re-used at a future time after the determination has been made.

Similarly, in some embodiments, the program instructions of the system further effect: saving, by the at least one server, the determined sender type of the e-mail message, in a database in electronic communication with the at least one server; and saving, by the at least one server, the determined at least one message type of the e-mail message in the database.

In the context of the present application, junk e-mail (also known as "spam" or unsolicited bulk e-mail) generally includes unsolicited e-mail messages that are nearly identical that have been sent to a number recipients, typically with whom the sender has no prior relationship (other than perhaps having previously sent other junk e-mail messages). There are many kinds of conventional junk e-mail, most of which contain malware or a link to a site containing malware. Many conventional e-mail processing & delivery systems provide junk e-mail services that usually attempt to determine whether an e-mail is junk e-mail and if so take some action, such as label the e-mail message as junk e-mail, placing the e-mail message in a "junk e-mail" folder, not delivering the e-mail message, etc.

As was noted above, the determination of the sender type and the message type(s) is carried out on non-junk e-mail. This is because a large percentage (by some estimates up to 90%) of e-mail is junk e-mail and, since junk e-mail is unlikely to be acted upon by a user in most situations it would be highly inefficient to carry out a determination of a sender type and message type(s) on junk e-mail. (However, the present technology does not exclude junk e-mail and in some particular situations such a determination could, if so desired, be carried on junk-email.) In some embodiments, likely depending on the architecture of the e-mail processing and delivery system concerned, the determination of whether an e-mail message is junk and the determination sender type and message type(s) of the e-mail message are carried out contemporaneously. In some other embodiments, they are carried out sequentially.

As was noted above, the present technology also provides for certain action(s) to be taken or permitted to be taken depending on the categorization of an e-mail message. One such possible action is the reformatting of an e-mail message (or a portion of an e-mail message) based on the categorization thereof. Thus, for example, this would allow for e-mail messages containing ticketing information (e.g. having a message type of "ticket") to be displayed in the same way (or in one of a number of standardized ways) potentially allowing for a user to be more readily provided with the information that the e-mail message is trying to conveying, and thus potentially simplify e-mail message management.

Thus in another aspect, embodiments of the present technology provide a method of reformatting an e-mail message having a header and a body having content in a received format, the method comprising:
    receiving, by at least one server via a communications network, the e-mail message;
    saving, by the at least one server, the e-mail message in a database in communication with the at least one server;
    receiving, by the at least one server from a client device, a request to retrieve the e-mail message;
    retrieving, by the at least one server, the e-mail message from at least one database;
    determining, by the at least one server, a classification of the e-mail message from the at least one database, the classification including a sender type and at least one message type; and
    reformatting at least some of the content of the body of the message into a predetermined format associated with the determined classification of the e-mail message; and
    sending, by the at least one server to the client device, at least some of the reformatted content of the body of the message.

Similarly, in another aspect, embodiments of the present technology provide a method of reformatting an e-mail message having a header and a body having content in a received format, the method comprising:
    receiving, by at least one server via a communications network, the e-mail message;
    determining, by the at least one server, a classification of the e-mail message from the at least one database, the classification including a sender type and at least one message type;
    reformatting at least some of the content of the body of the message into a predetermined format associated with the determined classification of the e-mail message;
    saving, by the at least one server, the e-mail message including the reformatted content in a database in communication with the at least one server;
    receiving, by the at least one server from a client device, a request to retrieve the e-mail message;
    retrieving, by the at least one server, the e-mail message from at least one database; and
    sending, by the at least one server to the client device, at least some of the reformatted content of the body of the message.

Thus in another aspect, embodiments of the present technology provide a method of reformatting an e-mail message having a header and a body having content in a received format, the method comprising:
    receiving, by at least one server via a communications network, the e-mail message;
    determining, by the at least one server, a classification of the e-mail message from the at least one database, the classification including a sender type and at least one message type;
    saving, by the at least one server, the e-mail message and the classification of the e-mail message in a database in communication with the at least one server;
    receiving, by the at least one server from a client device, a request to retrieve the e-mail message;
    retrieving, by the at least one server, the e-mail message and the classification of the e-mail message from at least one database;
    reformatting at least some of the content of the body of the message into a predetermined format associated with the retrieved classification of the e-mail message; and
    sending, by the at least one server to the client device, at least some of the reformatted content of the body of the message.

Similarly, in another aspect, embodiments of the present technology provide a system for reformatting an e-mail message having a header and a body having content in a received format, the system including:
    at least one server including a computer processor;
    at least one database in electronic communication with the at least one server;
    a non-transitory computer readable information storage medium in electronic communication with the at least one server containing program instructions that when executed by the computer processor effect:

receiving, by at least one server via a communications network, the e-mail message;

saving, by the at least one server, the e-mail message in a database in communication with the at least one server;

receiving, by the at least one server from a client device, a request to retrieve the e-mail message;

retrieving, by the at least one server, the e-mail message from at least one database;

determining, by the at least one server, a classification of the e-mail message from the at least one database, the classification including a sender type and at least one message type; and reformatting at least some of the content of the body of the message into a predetermined format associated with the determined classification of the e-mail message; and sending, by the at least one server to the client device, at least some of the reformatted content of the body of the message.

Similarly, in another aspect, embodiments of the present technology provide a system for reformatting an e-mail message having a header and a body having content in a received format, the system including:

at least one server including a computer processor;

at least one database in electronic communication with the at least one server;

a non-transitory computer readable information storage medium in electronic communication with the at least one server containing program instructions that when executed by the computer processor effect:

receiving, by at least one server via a communications network, the e-mail message;

determining, by the at least one server, a classification of the e-mail message from the at least one database, the classification including a sender type and at least one message type;

reformatting at least some of the content of the body of the message into a predetermined format associated with the determined classification of the e-mail message;

saving, by the at least one server, the e-mail message including the reformatted content in a database in communication with the at least one server;

receiving, by the at least one server from a client device, a request to retrieve the e-mail message;

retrieving, by the at least one server, the e-mail message from at least one database; and sending, by the at least one server to the client device, at least some of the reformatted content of the body of the message.

Similarly, in another aspect, embodiments of the present technology provide a system for reformatting an e-mail message having a header and a body having content in a received format, the system including:

at least one server including a computer processor;

at least one database in electronic communication with the at least one server;

a non-transitory computer readable information storage medium in electronic communication with the at least one server containing program instructions that when executed by the computer processor effect:

receiving, by at least one server via a communications network, the e-mail message;

determining, by the at least one server, a classification of the e-mail message from the at least one database, the classification including a sender type and at least one message type;

saving, by the at least one server, the e-mail message and the classification of the e-mail message in a database in communication with the at least one server;

receiving, by the at least one server from a client device, a request to retrieve the e-mail message;

retrieving, by the at least one server, the e-mail message and the classification of the e-mail message from at least one database;

reformatting at least some of the content of the body of the message into a predetermined format associated with the retrieved classification of the e-mail message; and sending, by the at least one server to the client device, at least some of the reformatted content of the body of the message.

In addition (or in place of) to the type of reformatting described hereinabove, another such possible action that may be taken or permitted to be taken depending on the categorization of an e-mail message is the provision of a widget (e.g. a small software application) (another type of reformatting) in the e-mail reading pane/window. Thus, for example, continuing with the above example, in addition to displaying ticketing information a standardized format in the e-mail message reading pane/window, the user could also be provided with a widget in the form of, for example, a bubble providing the then current weather for the arrival location. Clicking on the bubble could, for example, open a browser window or tab and provide the user with a site providing detailed weather information. (A widget in the present context may be any nature or kind of widget.)

Thus in another aspect, embodiments of the present technology provide a method of reformatting an e-mail message having a header and a body having content in a received format, the method comprising:

receiving, by at least one server via a communications network, the e-mail message;

saving, by the at least one server, the e-mail message in a database in communication with the at least one server;

receiving, by the at least one server from a client device, a request to retrieve the e-mail message;

retrieving, by the at least one server, the e-mail message from at least one database;

determining, by the at least one server, a classification of the e-mail message from the at least one database, the classification including a sender type and at least one message type;

(optionally, reformatting at least some of the content of the body of the message into a predetermined format associated with the determined classification of the e-mail message;)

sending, by the at least one server to the client device, at least some of the content of the body of the message; and sending, by the at least one server to the client device, instruction to display, along with the content, a user-selectable graphical element for causing a function to be performed in respect of the one of the e-mail messages, the function being based, at least in part, on the classification of the first one of the e-mail messages.

Similarly, in another aspect, embodiments of the present technology provide a method of reformatting an e-mail message having a header and a body having content in a received format, the method comprising:

receiving, by at least one server via a communications network, the e-mail message;

determining, by the at least one server, a classification of the e-mail message from the at least one database, the classification including a sender type and at least one message type; and (optionally, reformatting at least some of the content of the body of the message into a predetermined format associated with the determined classification of the e-mail message;)

saving, by the at least one server, the e-mail message including the reformatted content in a database in communication with the at least one server;

receiving, by the at least one server from a client device, a request to retrieve the e-mail message;

retrieving, by the at least one server, the e-mail message from at least one database;

sending, by the at least one server to the client device, at least some of the content of the body of the message; and sending, by the at least one server to the client device, instruction to display, along with the content, a user-selectable graphical element for causing a function to be performed in respect of the one of the e-mail messages, the function being based, at least in part, on the classification of the first one of the e-mail messages.

Similarly, in another aspect, embodiments of the present technology provide a method of reformatting an e-mail message having a header and a body having content in a received format, the method comprising:

receiving, by at least one server via a communications network, the e-mail message;

determining, by the at least one server, a classification of the e-mail message from the at least one database, the classification including a sender type and at least one message type;

saving, by the at least one server, the e-mail message and the classification of the e-mail message in a database in communication with the at least one server;

receiving, by the at least one server from a client device, a request to retrieve the e-mail message;

retrieving, by the at least one server, the e-mail message and the classification of the e-mail message from at least one database;

(optionally, reformatting at least some of the content of the body of the message into a predetermined format associated with the determined classification of the e-mail message;)

sending, by the at least one server to the client device, at least some of the content of the body of the message; and sending, by the at least one server to the client device, instruction to display, along with the content, a user-selectable graphical element for causing a function to be performed in respect of the one of the e-mail messages, the function being based, at least in part, on the classification of the first one of the e-mail messages.

Similarly, in another aspect, embodiments of the present technology provide a system for reformatting an e-mail message having a header and a body having content in a received format, the system including:

at least one server including a computer processor;

at least one database in electronic communication with the at least one server;

a non-transitory computer readable information storage medium in electronic communication with the at least one server containing program instructions that when executed by the computer processor effect:

receiving, by at least one server via a communications network, the e-mail message;

saving, by the at least one server, the e-mail message in a database in communication with the at least one server;

receiving, by the at least one server from a client device, a request to retrieve the e-mail message;

retrieving, by the at least one server, the e-mail message from at least one database;

determining, by the at least one server, a classification of the e-mail message from the at least one database, the classification including a sender type and at least one message type;

(optionally, reformatting at least some of the content of the body of the message into a predetermined format associated with the determined classification of the e-mail message;)

sending, by the at least one server to the client device, at least some of the content of the body of the message; and sending, by the at least one server to the client device, instruction to display, along with the content, a user-selectable graphical element for causing a function to be performed in respect of the one of the e-mail messages, the function being based, at least in part, on the classification of the first one of the e-mail messages.

Similarly, in another aspect, embodiments of the present technology provide a system for reformatting an e-mail message having a header and a body having content in a received format, the system including:

at least one server including a computer processor;

at least one database in electronic communication with the at least one server;

a non-transitory computer readable information storage medium in electronic communication with the at least one server containing program instructions that when executed by the computer processor effect:

receiving, by at least one server via a communications network, the e-mail message;

determining, by the at least one server, a classification of the e-mail message from the at least one database, the classification including a sender type and at least one message type; and (optionally, reformatting at least some of the content of the body of the message into a predetermined format associated with the determined classification of the e-mail message;)

saving, by the at least one server, the e-mail message including the reformatted content in a database in communication with the at least one server;

receiving, by the at least one server from a client device, a request to retrieve the e-mail message;

retrieving, by the at least one server, the e-mail message from at least one database;

sending, by the at least one server to the client device, at least some of the content of the body of the message; and Similarly, in another aspect, embodiments of the present technology provide a system for reformatting an e-mail message having a header and a body having content in a received format, the system including:

at least one server including a computer processor;

at least one database in electronic communication with the at least one server;

a non-transitory computer readable information storage medium in electronic communication with the at least one server containing program instructions that when executed by the computer processor effect:
- receiving, by at least one server via a communications network, the e-mail message;
- determining, by the at least one server, a classification of the e-mail message from the at least one database, the classification including a sender type and at least one message type;
- saving, by the at least one server, the e-mail message and the classification of the e-mail message in a database in communication with the at least one server;
- receiving, by the at least one server from a client device, a request to retrieve the e-mail message;
- retrieving, by the at least one server, the e-mail message and the classification of the e-mail message from at least one database;
- (optionally, reformatting at least some of the content of the body of the message into a predetermined format associated with the determined classification of the e-mail message;)
- sending, by the at least one server to the client device, at least some of the content of the body of the message; and
- sending, by the at least one server to the client device, instruction to display, along with the content, a user-selectable graphical element for causing a function to be performed in respect of the one of the e-mail messages, the function being based, at least in part, on the classification of the first one of the e-mail messages.

Another such possible action that may be taken or permitted to be taken depending on the categorization of an e-mail message is the provision of information in the e-mail message listing in the user's inbox (or other folder) other than the standard e-mail header information. This information could be in addition to some (or all) of the standard e-mail header information conventionally displayed or could be in place of such information. The source of such information could be, for example, from the body of the e-mail message, from an external source (e.g. an internet resource), or both. Thus, for example, were the e-mail to contain ticketing information (e.g. a message type of "ticket"), some of the relevant information could be extracted from the message (e.g. the flight number, the departure time, the departure location, the arrival time, the arrival location, etc.) and providing in the inbox message listing itself. Further, such information could be, for example, supplemented from information retrieved from an internet resource made available (e.g. the airline's website) to provide, for example, up-to-date to actual projected information (e.g. a then current actual projected departure time, then current actual projected arrival time, gate information, etc.)

Thus in another aspect, embodiments of the present technology provide a method of constructing a listing of e-mail messages, the method comprising:
- retrieving, by at least one server, information in respect of a plurality of e-mail messages from at least one database in electronic communication with the at least one server, each e-mail message including a header having a plurality of header fields and a body having content;
- sending, by the at least one server to a client device via a communications network, instruction to display in one of an e-mail message listing pane or an e-mail message listing window in a graphical user interface of the client device, a listing of e-mails, the listing including in respect of at least some of the e-mail messages listing information including at least some of the header fields;
- for a first one of the e-mail messages, one of determining a classification of the first one of the e-mail messages by the at least one server and retrieving from the database a classification of the first one of the e-mail messages by the at least one server, the classification including a sender type and at least one message type; and
- sending, by the at least one server to the client device via the communications network, instruction to display in the listing information in respect of the first one of the e-mail messages appearing in the listing of e-mail messages of information other than that of the header fields, the other information displayed in a first predetermined format associated with the classification of the e-mail message, the first predetermined format being other than a format in which the content of the body was originally received.

In some embodiments, the method further comprises:
- for a second one of the e-mail messages, one of determining a classification of the second one of the e-mail messages by the at least one server and retrieving from the database a classification of the second one of the e-mail messages by the at least one server, the classification including a sender type and at least one message type, the classification of the second one of the e-mail messages differing from the classification of the first one of the e-mail messages;
- sending, by the at least one server to the client device via the communications network, instruction to display in the listing information in respect of the second one of the e-mail messages appearing in the listing of e-mail messages of information other than that of the header fields, the other information being displayed in a second predetermined format associated with the classification of the e-mail message, the second predetermined format being other than a format in which the content of the body was originally received, the second predetermined format differing from the first predetermined format.

Similarly, in another aspect, embodiments of the present technology provide a system for constructing a listing of e-mail messages, the system including:
- at least one server including a computer processor;
- at least one database in electronic communication with the at least one server;
- a non-transitory computer readable information storage medium in electronic communication with the at least one server containing program instructions that when executed by the computer processor effect:
  - retrieving, by at least one server, information in respect of a plurality of e-mail messages from at least one database in electronic communication with the at least one server, each e-mail message including a header having a plurality of header fields and a body having content;
  - sending, by the at least one server to a client device via a communications network, instruction to display in one of an e-mail message listing pane or an e-mail message listing window in a graphical user interface of the client device, a listing of e-mails, the listing including in respect of at least some of the e-mail messages listing information including at least some of the header fields;
  - for a first one of the e-mail messages, one of determining a classification of the first one of the e-mail messages by the at least one server and retrieving from the database a classification of the first one of the e-mail messages by the at least one server, the classification including a sender type and at least one message type; and sending, by the at least one server to the client device via the communications network, instruction to display in the listing information in respect of the first one of the e-mail messages appearing in the listing of e-mail messages of information other than that of the header fields, the other information being displayed in a first predetermined format associated with the classification of the e-mail message, the first predetermined format being other than a format in which the content of the body was originally received.

In some embodiments, the program instructions, when executed by the computer processor further effect:

for a second one of the e-mail messages, one of determining a classification of the second one of the e-mail messages by the at least one server and retrieving from the database a classification of the second one of the e-mail messages by the at least one server, the classification including a sender type and at least one message type, the classification of the second one of the e-mail messages differing from the classification of the first one of the e-mail messages;

sending, by the at least one server to the client device via the communications network, instruction to display in the listing information in respect of the second one of the e-mail messages appearing in the listing of e-mail messages of information other than that of the header fields, the other information being displayed in a second predetermined format associated with the classification of the e-mail message, the second predetermined format being other than a format in which the content of the body was originally received, the second predetermined format differing from the first predetermined format.

In addition (or in place of) to the provision of information in the e-mail message listing other than the standard heading information, another such possible action that may be taken or permitted to be taken depending on the categorization of an e-mail message is the provision of a widget (e.g. a small software application) in the e-mail message listing. Thus, for example, continuing with the above example, in addition to providing flight information in the e-mail message listing in the user's inbox, the user could also be provided with a widget in the form of a button (e.g. labeled "check-in now"), which, when clicked by the user, would open a browser window/tab on the user's computer and take the user directly to the check-in web page for the airline on which is operating the flight. A widget in the present context may be any nature or kind of widget.

Thus in another aspect, embodiments of the present technology provide a method of constructing a listing of e-mail messages, the method comprising:

retrieving, by at least one server, information in respect of a plurality of e-mail messages from at least one database in electronic communication with the at least one server, each e-mail message including a header having a plurality of header fields and a body having content;

sending, by the at least one server to a client device via a communications network, instruction to display in one of an e-mail message listing pane or an e-mail message listing window in a graphical user interface of the client device, a listing of e-mails, the listing including in respect of at least some of the e-mail messages listing information including at least some of the header fields;

for a first one of the e-mail messages, one of determining a classification of the first one of the e-mail messages by the at least one server and retrieving from the database a classification of the first one of the e-mail messages by the at least one server, the classification including a sender type and at least one message type; and sending, by the at least one server to the client device via the communications network, instruction to display in the listing information in respect of the first one of the e-mail messages appearing in the listing of e-mail messages a first user-selectable graphical element for causing a first function to be performed in respect of the first one of the e-mail messages, the first function being based, at least in part, on the classification of the first one of the e-mail messages.

In some embodiments, the method further comprises:

for a second one of the e-mail messages, one of determining a classification of the second one of the e-mail messages by the at least one server and retrieving from the database a classification of the second one of the e-mail messages by the at least one server, the classification including a sender type and at least one message type, the classification of the second one of the e-mail messages differing from the classification of the first one of the e-mail messages;

sending, by the at least one server to the client device via the communications network, instruction to display in the listing information in respect of the second one of the e-mail messages appearing in the listing of e-mail messages a second user-selectable graphical element for causing a second function to be performed in respect of the second one of the e-mail messages, the second function being based, at least in part, on the classification of the second one of the e-mail messages, the second function differing from the first function.

Similarly, in another aspect, embodiments of the present technology provide a system for constructing a listing of e-mail messages, the system including:

at least one server including a computer processor;

at least one database in electronic communication with the at least one server;

a non-transitory computer readable information storage medium in electronic communication with the at least one server containing program instructions that when executed by the computer processor effect:

retrieving, by at least one server, information in respect of a plurality of e-mail messages from at least one database in electronic communication with the at least one server, each e-mail message including a header having a plurality of header fields and a body having content;

sending, by the at least one server to a client device via a communications network, instruction to display in one of an e-mail message listing pane or an e-mail message listing window in a graphical user interface of the client device, a listing of e-mails, the listing including in respect of at least some of the e-mail messages listing information including at least some of the header fields;

for a first one of the e-mail messages, one of determining a classification of the first one of the e-mail messages by the at least one server and retrieving from the database a classification of the first one of the e-mail messages by the at least one server, the classification including a sender type and at least one message type; and sending, by the at least one server to the client device via the communications network, instruction to display in the listing information in respect of the first one of the e-mail messages appearing in the listing of e-mail messages a first user-selectable graphical element for causing a first function to be performed in respect of the first one of the e-mail messages, the first function being based, at least in part, on the classification of the first one of the e-mail messages.

In some embodiments, the program instructions, when executed by the computer processor further effect:

for a second one of the e-mail messages, one of determining a classification of the second one of the e-mail messages by the at least one server and retrieving from the database a classification of the second one of the e-mail messages by the at least one server, the classification including a sender type and at least one message type, the classification of the second one of the e-mail messages differing from the classification of the first one of the e-mail messages;

sending, by the at least one server to the client device via the communications network, instruction to display in the listing information in respect of the second one of the e-mail messages appearing in the listing of e-mail messages a second user-selectable graphical element for causing a second function to be performed in respect of the second one of the e-mail messages, the second function being based, at least in part, on the classification of the second one of the e-mail messages, the second function differing from the first function.

Another such possible action that may be taken or permitted to be taken depending on the categorization of an e-mail message is the sorting of messages in the e-mail message listing in the user's inbox (or other folder) based on the messages' categorization(s) instead of (or in addition to) standard e-mail header information.

Thus in another aspect, embodiments of the present technology provide a method of constructing a listing of e-mail messages, the method comprising:

retrieving, by at least one server, information in respect of a plurality of e-mail messages from at least one database in electronic communication with the at least one server, each e-mail message including a header having a plurality of header fields and a body having content;

sending, by the at least one server to a client device via a communications network, instruction to display in one of an e-mail message listing pane or an e-mail message listing window in a graphical user interface of the client device, a listing of e-mails, the listing including in respect of at least some of the e-mail messages listing information including at least some of the header fields;

for at least some of the e-mail messages, one of determining a classification of the e-mail messages by the at least one server and retrieving from the database a classification of the e-mail messages by the at least one server, the classification including a sender type and at least one message type;

receiving, by the at least one server from the client device via the communications network, a request to sort the listing of e-mails by e-message classification;

sorting, by the at least one server, the listing of e-mails by e-mail classification; and sending, by the at least one server to a client device via a communications network, instruction to display in the one of an e-mail message listing pane or an e-mail message listing window in a graphical user interface of the client device, the sorted listing of e-mails.

Similarly, in another aspect, embodiments of the present technology provide a system for constructing a listing of e-mail messages, the system including:

at least one server including a computer processor;

at least one database in electronic communication with the at least one server;

a non-transitory computer readable information storage medium in electronic communication with the at least one server containing program instructions that when executed by the computer processor effect:

retrieving, by at least one server, information in respect of a plurality of e-mail messages from at least one database in electronic communication with the at least one server, each e-mail message including a header having a plurality of header fields and a body having content;

sending, by the at least one server to a client device via a communications network, instruction to display in one of an e-mail message listing pane or an e-mail message listing window in a graphical user interface of the client device, a listing of e-mails, the listing including in respect of at least some of the e-mail messages listing information including at least some of the header fields;

for at least some of the e-mail messages, one of determining a classification of the e-mail messages by the at least one server and retrieving from the database a classification of the e-mail messages by the at least one server, the classification including a sender type and at least one message type;

receiving, by the at least one server from the client device via the communications network, a request to sort the listing of e-mails by e-message classification;

sorting, by the at least one server, the listing of e-mails by e-mail classification; and sending, by the at least one server to a client device via a communications network, instruction to display in the one of an e-mail message listing pane or an e-mail message listing window in a graphical user interface of the client device, the sorted listing of e-mails.

According to a some broad aspects of the present technology, there is provided a method of processing an e-mail message to determine a categorization thereof, the categorization including a sender type and a message type, the method comprising: receiving an e-mail message by at least one server, the e-mail message including a header having a plurality of header fields and body having content; if the e-mail message is not junk e-mail, determining, by the at least one server, the sender type of the e-mail message, the sender type being one from a plurality of potential sender types, via a first analysis of the header and the body, the first analysis including application of at least one first complex rule, each applied first complex rule including a plurality of elementary rules specific to that applied first complex rule, at least some of the plurality of elementary rules specific to that applied first complex rule including a regular expression analysis; and if the e-mail message is not junk e-mail, determining, by the at least one server, at least one message type of the e-mail message, a message type being one from a plurality of potential message types, via a second analysis of the header and the body, the second analysis including application of at least one second complex rule, each applied second complex rule including a plurality of elementary rules specific to that applied second complex rule, at least some of the second plurality of elementary rules specific to that applied second complex rule including a regular expression analysis.

In some implementations of the method, the method further comprises saving, by the at least one server, the determined sender type of the e-mail message, in a database in electronic communication with the at least one server; and saving, by the at least one server, the determined at least one message type of the e-mail message in the database.

In some implementations of the method, the method further comprises, prior to determining the sender type of the e-mail message and to determining the at least one message type of the e-mail message, determining whether the e-mail message is junk e-mail.

In some implementations of the method, the method further comprises contemporaneous with at least one of determining the sender type of the e-mail message and determining the at least one message type of the e-message, determining whether the e-mail message is junk e-mail.

In some implementations of the method, at least one of the first analysis and the second analysis includes a linguistic analysis.

In some implementations of the method, at least one of the first analysis and the second analysis includes analysis of a digital signature associated with the e-mail message.

In some implementations of the method, at least one of the first analysis and the second analysis includes analysis of an attachment associated with the e-mail message.

In some implementations of the method, at least one of the first analysis and the second analysis includes analysis of an image included in the body of the e-mail.

In some implementations of the method, at least one of the first analysis and the second analysis includes analysis of a link included in the body of the e-mail.

In some implementations of the method, the plurality of potential sender types includes individuals, social networks, discount services, financial institutions, airlines, hotels, railways, real estate services, classifieds, and e-mail systems.

In some implementations of the method, the determination of the at least one message type is based, at least in part, on the determination of the sender type.

In some implementations of the method, the at least one message type is a plurality of message types.

According to another broad aspect of the present technology, there is provided a system for processing an e-mail message to determine a categorization thereof, the categorization including a sender type and a message type, the system including: at least one server including a computer processor; at least one database in electronic communication with the at least one server; a non-transitory computer readable information storage medium in electronic communication with the at least one server containing program instructions that when executed by the computer processor effect: receiving an e-mail message by at least one server, the e-mail message including a header having a plurality of header fields and body having content; if the e-mail message is not junk e-mail, determining, by the at least one server, the sender type of the e-mail message, the sender type being one from a plurality of potential sender types, via a first analysis of the header and the body, the first analysis including application of at least one first complex rule, each applied first complex rule including a plurality of elementary rules specific to that applied first complex rule, at least some of the plurality of elementary rules specific to that applied first complex rule including a regular expression analysis; and if the e-mail message is not junk e-mail, determining, by the at least one server, at least one message type of the e-mail message, a message type being one from a plurality of potential message types, via a second analysis of the header and the body, the second analysis including application of at least one second complex rule, each applied second complex rule including a plurality of elementary rules specific to that applied second complex rule, at least some of the second plurality of elementary rules specific to that applied second complex rule including a regular expression analysis.

In some implementations of the system, the program instructions when executed by the computer processor further effect: saving, by the at least one server, the determined sender type of the e-mail message, in a database in electronic communication with the at least one server; and saving, by the at least one server, the determined at least one message type of the e-mail message in the database.

In some implementations of the system, the program instructions when executed by the computer processor further effect: prior to determining the sender type of the e-mail message and to determining the at least one message type of the e-mail message, determining whether the e-mail message is junk e-mail.

In some implementations of the system, the program instructions when executed by the computer processor further effect: contemporaneous with at least one of determining the sender type of the e-mail message and determining the at least one message type of the e-message, determining whether the e-mail message is junk e-mail.

In some implementations of the system, at least one of the first analysis and the second analysis includes a linguistic analysis.

In some implementations of the system, at least one of the first analysis and the second analysis includes analysis of a digital signature associated with the e-mail message.

In some implementations of the system, at least one of the first analysis and the second analysis includes analysis of an attachment associated with the e-mail message.

In some implementations of the system, at least one of the first analysis and the second analysis includes analysis of an image included in the body of the e-mail.

In some implementations of the system, at least one of the first analysis and the second analysis includes analysis of a link included in the body of the e-mail.

In some implementations of the system, the plurality of potential sender types includes individuals, social networks, discount services, financial institutions, airlines, hotels, railways, real estate services, classifieds, and e-mail systems.

In some implementations of the system, the determination of the at least one message type is based, at least in part, on the determination of the sender type.

In some implementations of the system, the at least one message type is a plurality of message types.

According to another broad aspect of the present technology, there is provided a method of reformatting an e-mail message having a header and a body having content in a received format, the method comprising: receiving, by at least one server via a communications network, the e-mail message; saving, by the at least one server, the e-mail message in a database in communication with the at least one server; receiving, by the at least one server from a client device, a request to retrieve the e-mail message; retrieving, by the at least one server, the e-mail message from at least one database; determining, by the at least one server, a classification of the e-mail message from the at least one database, the classification including a sender type and at least one message type; and reformatting at least some of the content of the body of the message into a predetermined format associated with the determined classification of the e-mail message; and sending, by the at least one server to the client device, at least some of the reformatted content of the body of the message.

In some implementations of the method, the reformatting comprises at least one adding a first image to the body of the message and deleting a second image from the body of the message.

In some implementations of the method, the reformatting comprises at least one adding a first text to the body of the message and deleting a second text from the body of the message.

In some implementations of the method, the reformatting comprises retrieving the predetermined format.

In some implementations of the method, the method further comprises, prior to the receiving of the e-mail message, storing a respective predetermined format for each of the potential classifications of the e-mail message.

In some implementations of the method, the reformatting further comprises dynamically creating the predetermined format based on the determined classification of the e-mail message.

In some implementations of the method, the e-mail message being a first e-mail message, the classification of the e-mail message being a first classification, the predetermined format being a first predetermined format, the method further comprising: receiving, by at least one server via a communications network, a second e-mail message; determining, by the at least one server, a second classification of the second e-mail message from the at least one database, the classification including a sender type and at least one message type; and reformatting at least some of the content of the body of the second message into a second predetermined format associated with the determined classification of the e-mail message; the second predetermined format being different from the first predetermined format.

In some implementations of the method, the method further comprises determining the first predetermined format and the second pre-determined format prior to the receiving the first e-mail message.

In some implementations of the method, the method further comprises storing the first predetermined format and the second predetermined format, in association with the first classification and the second classification, in the database.

According to another broad aspect of the present technology, there is provided a method of reformatting an e-mail message having a header and a body having content in a received format, the method comprising: receiving, by at least one server via a communications network, the e-mail message; determining, by the at least one server, a classification of the e-mail message from the at least one database, the classification including a sender type and at least one message type; reformatting at least some of the content of the body of the message into a predetermined format associated with the determined classification of the e-mail message; saving, by the at least one server, the e-mail message including the reformatted content in a database in communication with the at least one server; receiving, by the at least one server from a client device, a request to retrieve the e-mail message; retrieving, by the at least one server, the e-mail message from at least one database; and sending, by the at least one server to the client device, at least some of the reformatted content of the body of the message.

In some implementations of the method, the reformatting comprises at least one adding a first image to the body of the message and deleting a second image from the body of the message.

In some implementations of the method, the reformatting comprises at least one adding a first text to the body of the message and deleting a second text from the body of the message.

In some implementations of the method, the reformatting comprises retrieving the predetermined format.

In some implementations of the method, the method further comprises, prior to the receiving of the e-mail message, storing a respective predetermined format for each of the potential classifications of the e-mail message.

In some implementations of the method, the reformatting further comprises dynamically creating the predetermined format based on the determined classification of the e-mail message.

In some implementations of the method, the e-mail message being a first e-mail message, the classification of the e-mail message being a first classification, the predetermined format being a first predetermined format, the method further comprising: receiving, by at least one server via a communications network, a second e-mail message; determining, by the at least one server, a second classification of the second e-mail message from the at least one database, the classification including a sender type and at least one message type; and reformatting at least some of the content of the body of the second message into a second predetermined format associated with the determined classification of the e-mail message; the second predetermined format being different from the first predetermined format.

In some implementations of the method, the method further comprises determining the first predetermined format and the second pre-determined format prior to the receiving the first e-mail message.

In some implementations of the method, the method further comprising storing the first predetermined format and the second predetermined format, in association with the first classification and the second classification, in the database.

According to yet another road aspect of the present technology, there is provided a method of reformatting an e-mail message having a header and a body having content in a received format, the method comprising: receiving, by at least one server via a communications network, the e-mail message; determining, by the at least one server, a classification of the e-mail message from the at least one database, the classification including a sender type and at least one message type; saving, by the at least one server, the e-mail message and the classification of the e-mail message in a database in communication with the at least one server; receiving, by the at least one server from a client device, a request to retrieve the e-mail message; retrieving, by the at least one server, the e-mail message and the classification of the e-mail message from at least one database; reformatting at least some of the content of the body of the message into a predetermined format associated with the retrieved classification of the e-mail message; and sending, by the at least one server to the client device, at least some of the reformatted content of the body of the message.

In some implementations of the method, the reformatting comprises at least one adding a first image to the body of the message and deleting a second image from the body of the message.

In some implementations of the method, the reformatting comprises at least one adding a first text to the body of the message and deleting a second text from the body of the message.

In some implementations of the method, the reformatting comprises retrieving the predetermined format.

In some implementations of the method, the method further comprises, prior to the receiving of the e-mail message, storing a respective predetermined format for each of the potential classifications of the e-mail message.

In some implementations of the method, the reformatting further comprises dynamically creating the predetermined format based on the determined classification of the e-mail message.

In some implementations of the method, the e-mail message being a first e-mail message, the classification of the e-mail message being a first classification, the predetermined format being a first predetermined format, the method further comprising: receiving, by at least one server via a communications network, a second e-mail message; determining, by the at least one server, a second classification of the second e-mail message from the at least one database, the classification including a sender type and at least one message type; and reformatting at least some of the content of the body of the second message into a second predetermined format associated with the determined classification of the e-mail message; the second predetermined format being different from the first predetermined format.

In some implementations of the method, the method further comprises determining the first predetermined format and the second pre-determined format prior to the receiving the first e-mail message.

In some implementations of the method, the method further comprises storing the first predetermined format and the second predetermined format, in association with the first classification and the second classification, in the database.

According to another broad aspect of the present technology, there is provided a system for reformatting an e-mail message having a header and a body having content in a received format, the system including: at least one server including a computer processor; at least one database in electronic communication with the at least one server; a non-transitory computer readable information storage medium in electronic communication with the at least one server containing program instructions that when executed by the computer processor effect: receiving, by at least one server via a communications network, the e-mail message; saving, by the at least one server, the e-mail message in a database in communication with the at least one server; receiving, by the at least one server from a client device, a request to retrieve the e-mail message; retrieving, by the at least one server, the e-mail message from at least one database; determining, by the at least one server, a classification of the e-mail message from the at least one database, the classification including a sender type and at least one message type; and reformatting at least some of the content of the body of the message into a predetermined format associated with the determined classification of the e-mail message; and sending, by the at least one server to the client device, at least some of the reformatted content of the body of the message.

In some implementations of the system, wherein to effect the reformatting, the program instructions further configured to effect at least one adding a first image to the body of the message and deleting a second image from the body of the message.

In some implementations of the system, to effect the reformatting, the program instructions further configured to effect at least one adding a first text to the body of the message and deleting a second text from the body of the message.

In some implementations of the system, to effect the reformatting, the program instructions further configured to effect retrieving the predetermined format.

In some implementations of the system, the program instructions further configured to effect, prior to the receiving of the e-mail message, storing a respective predetermined format for each of the potential classifications of the e-mail message.

In some implementations of the system, to effect the reformatting, the program instructions further configured to effect dynamically creating the predetermined format based on the determined classification of the e-mail message.

In some implementations of the system, the e-mail message being a first e-mail message, the classification of the e-mail message being a first classification, the predetermined format being a first predetermined format, the program instructions further configured to effect: receiving, by at least one server via a communications network, a second e-mail message; determining, by the at least one server, a second classification of the second e-mail message from the at least one database, the classification including a sender type and at least one message type; and reformatting at least some of the content of the body of the second message into a second predetermined format associated with the determined classification of the e-mail message; the second predetermined format being different from the first predetermined format.

In some implementations of the system, the program instructions further configured to effect determining the first predetermined format and the second pre-determined format prior to the receiving the first e-mail message.

In some implementations of the system, the program instructions further configured to effect storing the first predetermined format and the second predetermined format, in association with the first classification and the second classification, in the database.

According to another broad aspect of the present technology, there is provided a system for reformatting an e-mail message having a header and a body having content in a received format, the system including: at least one server including a computer processor; at least one database in electronic communication with the at least one server; a non-transitory computer readable information storage medium in electronic communication with the at least one server containing program instructions that when executed by the computer processor effect: receiving, by at least one server via a communications network, the e-mail message; determining, by the at least one server, a classification of the e-mail message from the at least one database, the classification including a sender type and at least one message type; reformatting at least some of the content of the body of the message into a predetermined format associated with the determined classification of the e-mail message; saving, by the at least one server, the e-mail message including the reformatted content in a database in communication with the at least one server; receiving, by the at least one server from a client device, a request to retrieve the e-mail message; retrieving, by the at least one server, the e-mail message from at least one database; and sending, by the at least one server to the client device, at least some of the reformatted content of the body of the message.

In some implementations of the system, to effect the reformatting, the program instructions further configured to effect at least one adding a first image to the body of the message and deleting a second image from the body of the message.

In some implementations of the system, to effect the reformatting, the program instructions further configured to effect at least one adding a first text to the body of the message and deleting a second text from the body of the message.

In some implementations of the system, to effect the reformatting, the program instructions further configured to effect retrieving the predetermined format.

In some implementations of the system, the program instructions further configured to effect, prior to the receiving of the e-mail message, storing a respective predetermined format for each of the potential classifications of the e-mail message.

In some implementations of the system, to effect the reformatting, the program instructions further configured to effect dynamically creating the predetermined format based on the determined classification of the e-mail message.

In some implementations of the system, the e-mail message being a first e-mail message, the classification of the e-mail message being a first classification, the predetermined format being a first predetermined format, the program instructions further configured to effect: receiving, by at least one server via a communications network, a second e-mail message; determining, by the at least one server, a second classification of the second e-mail message from the at least one database, the classification including a sender type and at least one message type; and reformatting at least some of the content of the body of the second message into a second predetermined format associated with the determined classification of the e-mail message; the second predetermined format being different from the first predetermined format.

In some implementations of the system, the program instructions further configured to effect determining the first predetermined format and the second pre-determined format prior to the receiving the first e-mail message.

In some implementations of the system, the program instructions further configured to effect storing the first predetermined format and the second predetermined format, in association with the first classification and the second classification, in the database.

According to another broad aspect of the present technology, there is provided a system for reformatting an e-mail message having a header and a body having content in a received format, the system including: at least one server including a computer processor; at least one database in electronic communication with the at least one server; a non-transitory computer readable information storage medium in electronic communication with the at least one server containing program instructions that when executed by the computer processor effect: receiving, by at least one server via a communications network, the e-mail message; determining, by the at least one server, a classification of the e-mail message from the at least one database, the classification including a sender type and at least one message type; saving, by the at least one server, the e-mail message and the classification of the e-mail message in a database in communication with the at least one server; receiving, by the at least one server from a client device, a request to retrieve the e-mail message; retrieving, by the at least one server, the e-mail message and the classification of the e-mail message from at least one database; reformatting at least some of the content of the body of the message into a predetermined format associated with the retrieved classification of the e-mail message; and sending, by the at least one server to the client device, at least some of the reformatted content of the body of the message.

In some implementations of the system, to effect the reformatting, the program instructions further configured to effect at least one adding a first image to the body of the message and deleting a second image from the body of the message.

In some implementations of the system, to effect the reformatting, the program instructions further configured to effect at least one adding a first text to the body of the message and deleting a second text from the body of the message.

In some implementations of the system, to effect the reformatting, the program instructions further configured to effect retrieving the predetermined format.

In some implementations of the system, the program instructions further configured to effect, prior to the receiving of the e-mail message, storing a respective predetermined format for each of the potential classifications of the e-mail message.

In some implementations of the system, to effect the reformatting, the program instructions further configured to effect dynamically creating the predetermined format based on the determined classification of the e-mail message.

In some implementations of the system, the e-mail message being a first e-mail message, the classification of the e-mail message being a first classification, the predetermined format being a first predetermined format, the program instructions further configured to effect: receiving, by at least one server via a communications network, a second e-mail message; determining, by the at least one server, a second classification of the second e-mail message from the at least one database, the classification including a sender type and at least one message type; and reformatting at least some of the content of the body of the second message into a second predetermined format associated with the determined classification of the e-mail message; the second predetermined format being different from the first predetermined format.

In some implementations of the system, the program instructions further configured to effect determining the first predetermined format and the second pre-determined format prior to the receiving the first e-mail message.

In some implementations of the system, the program instructions further configured to effect storing the first predetermined format and the second predetermined format, in association with the first classification and the second classification, in the database.

According to another broad aspect of the present technology, there is provided a method of reformatting an e-mail message having a header and a body having content in a received format, the method comprising: receiving, by at least one server via a communications network, the e-mail message; saving, by the at least one server, the e-mail message in a database in communication with the at least one server; receiving, by the at least one server from a client device, a request to retrieve the e-mail message; retrieving, by the at least one server, the e-mail message from at least one database; determining, by the at least one server, a classification of the e-mail message from the at least one database, the classification including a sender type and at least one message type; sending, by the at least one server to the client device, at least some of the content of the body of the message; and sending, by the at least one server to the client device, instruction to display, along with the content, a user-selectable graphical element for causing a function to be performed in respect of the one of the e-mail messages, the function being based, at least in part, on the classification of the first one of the e-mail messages.

In some implementations of the method, the method further comprising, prior to the sending at least some of the content of the body of the message, reformatting at least some of the content of the body of the message into a predetermined format associated with the determined classification of the e-mail message.

In some implementations of the method, the reformatting comprises at least one adding a first image to the body of the message and deleting a second image from the body of the message.

In some implementations of the method, the reformatting comprises at least one adding a first text to the body of the message and deleting a second text from the body of the message.

In some implementations of the method, the user-selectable graphical element comprises a widget.

In some implementations of the method, the user-selectable graphical element, when actuated by a user, is configured to open a browser application.

In some implementations of the method, the user-selectable graphical element, when actuated by the user, is further configured to cause the browser application to display a web resource, the web resource selected based on the classification of the e-mail message and the at least some of the content of the body of the message.

According to another broad aspect of the present technology, there is provided a method of reformatting an e-mail message having a header and a body having content in a received format, the method comprising: receiving, by at least one server via a communications network, the e-mail message; determining, by the at least one server, a classification of the e-mail message from the at least one database, the classification including a sender type and at least one message type; and saving, by the at least one server, the e-mail message including the reformatted content in a database in communication with the at least one server; receiving, by the at least one server from a client device, a request to retrieve the e-mail message; retrieving, by the at least one server, the e-mail message from at least one database; sending, by the at least one server to the client device, at least some of the content of the body of the message; and sending, by the at least one server to the client device, instruction to display, along with the content, a user-selectable graphical element for causing a function to be performed in respect of the one of the e-mail messages, the function being based, at least in part, on the classification of the first one of the e-mail messages.

In some implementations of the method, the method further comprises, prior to the saving, reformatting at least some of the content of the body of the message into a predetermined format associated with the determined classification of the e-mail message.

In some implementations of the method, the reformatting comprises at least one adding a first image to the body of the message and deleting a second image from the body of the message.

In some implementations of the method, the reformatting comprises at least one adding a first text to the body of the message and deleting a second text from the body of the message.

In some implementations of the method, the user-selectable graphical element comprises a widget.

In some implementations of the method, the user-selectable graphical element, when actuated by a user, is configured to open a browser application.

In some implementations of the method, the user-selectable graphical element, when actuated by the user, is further configured to cause the browser application to display a web resource, the web resource selected based on the classification of the e-mail message and the at least some of the content of the body of the message.

According to another broad aspect of the present technology, there is provided a method of reformatting an e-mail message having a header and a body having content in a received format, the method comprising: receiving, by at least one server via a communications network, the e-mail message; determining, by the at least one server, a classification of the e-mail message from the at least one database, the classification including a sender type and at least one message type; saving, by the at least one server, the e-mail message and the classification of the e-mail message in a database in communication with the at least one server; receiving, by the at least one server from a client device, a request to retrieve the e-mail message; retrieving, by the at least one server, the e-mail message and the classification of the e-mail message from at least one database; sending, by the at least one server to the client device, at least some of the content of the body of the message; and sending, by the at least one server to the client device, instruction to display, along with the content, a user-selectable graphical element for causing a function to be performed in respect of the one of the e-mail messages, the function being based, at least in part, on the classification of the first one of the e-mail messages.

In some implementations of the method, the method further comprises, prior to the sending at least some of the content of the body of the message, reformatting at least some of the content of the body of the message into a predetermined format associated with the determined classification of the e-mail message.

In some implementations of the method, the reformatting comprises at least one adding a first image to the body of the message and deleting a second image from the body of the message.

In some implementations of the method, the reformatting comprises at least one adding a first text to the body of the message and deleting a second text from the body of the message.

In some implementations of the method, the user-selectable graphical element comprises a widget.

In some implementations of the method, the user-selectable graphical element, when actuated by a user, is configured to open a browser application.

In some implementations of the method, the user-selectable graphical element, when actuated by the user, is further configured to cause the browser application to display a web resource, the web resource selected based on the classification of the e-mail message and the at least some of the content of the body of the message.

According to another broad aspect of the present technology, there is provided a system for reformatting an e-mail message having a header and a body having content in a received format, the system including: at least one server including a computer processor; at least one database in electronic communication with the at least one server; a non-transitory computer readable information storage medium in electronic communication with the at least one server containing program instructions that when executed by the computer processor effect: receiving, by at least one server via a communications network, the e-mail message; saving, by the at least one server, the e-mail message in a database in communication with the at least one server; receiving, by the at least one server from a client device, a request to retrieve the e-mail message; retrieving, by the at least one server, the e-mail message from at least one database; determining, by the at least one server, a classification of the e-mail message from the at least one database, the classification including a sender type and at least one message type; sending, by the at least one server to the client device, at least some of the content of the body of the message; and sending, by the at least one server to the client device, instruction to display, along with the content, a user-selectable graphical element for causing a function to be performed in respect of the one of the e-mail messages, the function being based, at least in part, on the classification of the first one of the e-mail messages.

In some implementations of the system, the program instructions when executed by the computer processor further effect, prior to the sending at least some of the content of the body of the message, reformatting at least some of the content of the body of the message into a predetermined format associated with the determined classification of the e-mail message.

In some implementations of the system, to execute the reformatting, the program instructions when executed by the computer processor further effect at least one adding a first image to the body of the message and deleting a second image from the body of the message.

In some implementations of the system, to execute the reformatting, the program instructions when executed by the computer processor further effect at least one adding a first text to the body of the message and deleting a second text from the body of the message.

In some implementations of the system, the user-selectable graphical element comprises a widget.

In some implementations of the system, the user-selectable graphical element, when actuated by a user, is configured to open a browser application.

In some implementations of the system, the user-selectable graphical element, when actuated by the user, is further configured to cause the browser application to display a web resource, the web resource selected based on the classification of the e-mail message and the at least some of the content of the body of the message.

According to another broad aspect of the present technology, there is provided a system for reformatting an e-mail message having a header and a body having content in a received format, the system including: at least one server including a computer processor; at least one database in electronic communication with the at least one server; a non-transitory computer readable information storage medium in electronic communication with the at least one server containing program instructions that when executed by the computer processor effect: receiving, by at least one server via a communications network, the e-mail message; determining, by the at least one server, a classification of the e-mail message from the at least one database, the classification including a sender type and at least one message type; and saving, by the at least one server, the e-mail message including the reformatted content in a database in communication with the at least one server; receiving, by the at least one server from a client device, a request to retrieve the e-mail message; retrieving, by the at least one server, the e-mail message from at least one database; sending, by the at least one server to the client device, at least some of the content of the body of the message.

In some implementations of the system, the program instructions when executed by the computer processor further effect, prior to the saving the e-mail message, reformatting at least some of the content of the body of the message into a predetermined format associated with the determined classification of the e-mail message.

In some implementations of the system, to execute the reformatting, the program instructions when executed by the computer processor further effect at least one adding a first image to the body of the message and deleting a second image from the body of the message.

In some implementations of the system, to execute the reformatting, the program instructions when executed by the computer processor further effect at least one adding a first text to the body of the message and deleting a second text from the body of the message.

In some implementations of the system, the user-selectable graphical element comprises a widget.

In some implementations of the system, the user-selectable graphical element, when actuated by a user, is configured to open a browser application.

In some implementations of the system, the user-selectable graphical element, when actuated by the user, is further configured to cause the browser application to display a web resource, the web resource selected based on the classification of the e-mail message and the at least some of the content of the body of the message.

According to another broad aspect of the present technology, there is provided a system for reformatting an e-mail message having a header and a body having content in a received format, the system including: at least one server including a computer processor; at least one database in electronic communication with the at least one server; a non-transitory computer readable information storage medium in electronic communication with the at least one server containing program instructions that when executed by the computer processor effect: receiving, by at least one server via a communications network, the e-mail message; determining, by the at least one server, a classification of the e-mail message from the at least one database, the classification including a sender type and at least one message type; saving, by the at least one server, the e-mail message and the classification of the e-mail message in a database in communication with the at least one server; receiving, by the at least one server from a client device, a request to retrieve the e-mail message; retrieving, by the at least one server, the e-mail message and the classification of the e-mail message from at least one database; sending, by the at least one server to the client device, at least some of the content of the body of the message; and sending, by the at least one server to the client device, instruction to display, along with the content, a user-selectable graphical element for causing a function to be performed in respect of the one of the e-mail messages, the function being based, at least in part, on the classification of the first one of the e-mail messages.

In some implementations of the system, the program instructions when executed by the computer processor further effect, prior to the sending at least some of the content of the body of the message, reformatting at least some of the content of the body of the message into a predetermined format associated with the determined classification of the e-mail message.

In some implementations of the system, to execute the reformatting, the program instructions when executed by the computer processor further effect at least one adding a first image to the body of the message and deleting a second image from the body of the message.

In some implementations of the system, to execute the reformatting, the program instructions when executed by the computer processor further effect at least one adding a first text to the body of the message and deleting a second text from the body of the message.

In some implementations of the system, the user-selectable graphical element comprises a widget.

In some implementations of the system, the user-selectable graphical element, when actuated by a user, is configured to open a browser application.

In some implementations of the system, the user-selectable graphical element, when actuated by the user, is further configured to cause the browser application to display a web resource, the web resource selected based on the classification of the e-mail message and the at least some of the content of the body of the message.

According to another broad aspect of the present technology, there is provided a method of constructing a listing of e-mail messages, the method comprising: retrieving, by at least one server, information in respect of a plurality of e-mail messages from at least one database in electronic communication with the at least one server, each e-mail message including a header having a plurality of header fields and a body having content; sending, by the at least one server to a client device via a communications network, instruction to display in one of an e-mail message listing pane or an e-mail message listing window in a graphical user interface of the client device, a listing of e-mails, the listing including in respect of at least some of the e-mail messages listing information including at least some of the header fields; for a first one of the e-mail messages, one of determining a classification of the first one of the e-mail messages by the at least one server and retrieving from the database a classification of the first one of the e-mail messages by the at least one server, the classification including a sender type and at least one message type; and sending, by the at least one server to the client device via the communications network, instruction to display in the listing information in respect of the first one of the e-mail messages appearing in the listing of e-mail messages of information other than that of the header fields, the other information being displayed in a first predetermined format associated with the classification of the e-mail message, the first predetermined format being other than a format in which the content of the body was originally received.

In some implementations of the method, the method further comprises extracting the other information from the content of the body of the message.

In some implementations of the method, the method further comprises retrieving the other information from an internet resource.

In some implementations of the method, the method further comprises extracting the other information from the content of the body of the message and an internet resource.

In some implementations of the method, a portion of the other information from the internet source depends on a portion of the other information from the content of the body of the message.

In some implementations of the method, the other information including a hyperlink to an internet resource.

In some implementations of the method, instruction to display in the listing information in respect of the first one of the e-mail messages appearing in the listing of e-mail messages of information other than that of the header fields is for displaying the other information in addition to the header fields.

In some implementations of the method, instruction to display in the listing information in respect of the first one of the e-mail messages appearing in the listing of e-mail messages of information other than that of the header fields is for displaying the other information instead of the header fields.

In some implementations of the method, the method further comprises: for a second one of the e-mail messages, one of determining a classification of the second one of the e-mail messages by the at least one server and retrieving from the database a classification of the second one of the e-mail messages by the at least one server, the classification including a sender type and at least one message type, the classification of the second one of the e-mail messages differing from the classification of the first one of the e-mail messages; sending, by the at least one server to the client device via the communications network, instruction to display in the listing information in respect of the second one of the e-mail messages appearing in the listing of e-mail messages of information other than that of the header fields, the other information being displayed in a second predetermined format associated with the classification of the e-mail message, the second predetermined format being other than a format in which the content of the body was originally received, the second predetermined format differing from the first predetermined format.

According to another broad aspect of the present technology, there is provided a system for constructing a listing of e-mail messages, the system including: at least one server including a computer processor; at least one database in electronic communication with the at least one server; a non-transitory computer readable information storage medium in electronic communication with the at least one server containing program instructions that when executed by the computer processor effect: retrieving, by at least one server, information in respect of a plurality of e-mail messages from at least one database in electronic communication with the at least one server, each e-mail message including a header having a plurality of header fields and a body having content; sending, by the at least one server to a client device via a communications network, instruction to display in one of an e-mail message listing pane or an e-mail message listing window in a graphical user interface of the client device, a listing of e-mails, the listing including in respect of at least some of the e-mail messages listing information including at least some of the header fields; for a first one of the e-mail messages, one of determining a classification of the first one of the e-mail messages by the at least one server and retrieving from the database a classification of the first one of the e-mail messages by the at least one server, the classification including a sender type and at least one message type; and sending, by the at least one server to the client device via the communications network, instruction to display in the listing information in respect of the first one of the e-mail messages appearing in the listing of e-mail messages of information other than that of the header fields, the other information being displayed in a first predetermined format associated with the classification of the e-mail message, the first predetermined format being other than a format in which the content of the body was originally received.

In some implementations of the system, the program instructions when executed by the computer processor further effect: for a second one of the e-mail messages, one of determining a classification of the second one of the e-mail messages by the at least one server and retrieving from the database a classification of the second one of the e-mail messages by the at least one server, the classification including a sender type and at least one message type, the classification of the second one of the e-mail messages differing from the classification of the first one of the e-mail messages; sending, by the at least one server to the client device via the communications network, instruction to display in the listing information in respect of the second one of the e-mail messages appearing in the listing of e-mail messages of information other than that of the header fields, the other information being displayed in a second predetermined format associated with the classification of the e-mail message, the second predetermined format being other than a format in which the content of the body was originally received, the second predetermined format differing from the first predetermined format.

In some implementations of the system, the program instructions when executed by the computer processor further effect extracting the other information from the content of the body of the message.

In some implementations of the system, the program instructions when executed by the computer processor further effect retrieving the other information from an internet resource.

In some implementations of the system, the program instructions when executed by the computer processor further effect extracting the other information from the content of the body of the message and an internet resource.

In some implementations of the system, a portion of the other information from the internet source depends on a portion of the other information from the content of the body of the message.

In some implementations of the system, the other information including a hyperlink to an internet resource.

In some implementations of the system, the instruction to display in the listing information in respect of the first one of the e-mail messages appearing in the listing of e-mail messages of information other than that of the header fields is for displaying the other information in addition to the header fields.

In some implementations of the system, instruction to display in the listing information in respect of the first one of the e-mail messages appearing in the listing of e-mail messages of information other than that of the header fields is for displaying the other information instead of the header fields.

According to another broad aspect of the present technology, there is provided a method of constructing a listing of e-mail messages, the method comprising: retrieving, by at least one server, information in respect of a plurality of e-mail messages from at least one database in electronic communication with the at least one server, each e-mail message including a header having a plurality of header fields and a body having content; sending, by the at least one server to a client device via a communications network, instruction to display in one of an e-mail message listing pane or an e-mail message listing window in a graphical user interface of the client device, a listing of e-mails, the listing including in respect of at least some of the e-mail messages listing information including at least some of the header fields; for at least some of the e-mail messages, one of determining a classification of the e-mail messages by the at least one server and retrieving from the database a classification of the e-mail messages by the at least one server, the classification including a sender type and at least one message type; receiving, by the at least one server from the client device via the communications network, a request to sort the listing of e-mails by e-message classification; sorting, by the at least one server, the listing of e-mails by e-mail classification; sending, by the at least one server to a client device via a communications network, instruction to display in the one of an e-mail message listing pane or an e-mail message listing window in a graphical user interface of the client device, the sorted listing of e-mails.

In some implementations of the method, the sorting the listing of e-mails by e-mail classification comprises sorting the listing of e-mails, at least partially, based on a respective sender type.

In some implementations of the method, the sorting the listing of e-mails by e-mail classification comprises sorting the listing of e-mails, at least partially, based on a respective least one message type.

In some implementations of the method, the method further comprises sorting, by the at least one server, the listing of e-mails by a priority level.

In some implementations of the method, the method further comprises receiving, by the at least one server from the client device via the communications network, an indication of the priority level for each of the e-mail classifications.

In some implementations of the method, the instruction to display in the one of an e-mail message listing pane or an e-mail message listing window in a graphical user interface of the client device, the sorted listing of e-mails comprises an instruction to display the sorted listing of e-mails responsive to an indication of a user being desirous of seeing the sorted listing of e-mails.

In some implementations of the method, the method further comprises appreciating the indication of the user being desirous of seeing the sorted listing of e-mails.

In some implementations of the method, the instruction to display in the one of an e-mail message listing pane or an e-mail message listing window in a graphical user interface of the client device, the sorted listing of e-mails further comprises presenting a filter for selecting at least one specific category associated with at least one of the at least some of the e-mail messages within the sorted listing of e-mails.

In some implementations of the method, the method further comprises responsive to a user actuating the filter indicative of at least one specific category, causing the electronic device to only display e-mail messages of the at least one specific category.

In some implementations of the method, the filter being selected only on the basis of the at least one specific category of the at least one of the at least some of the e-mail messages being displayed in the e-mail message listing pane or the e-mail message listing window.

According to another broad aspect of the present technology, there is provided a system for constructing a listing of e-mail messages, the system including: at least one server including a computer processor; at least one database in electronic communication with the at least one server; a non-transitory computer readable information storage medium in electronic communication with the at least one server containing program instructions that when executed by the computer processor effect: retrieving, by at least one server, information in respect of a plurality of e-mail messages from at least one database in electronic communication with the at least one server, each e-mail message including a header having a plurality of header fields and a body having content; sending, by the at least one server to a client device via a communications network, instruction to display in one of an e-mail message listing pane or an e-mail message listing window in a graphical user interface of the client device, a listing of e-mails, the listing including in respect of at least some of the e-mail messages listing information including at least some of the header fields; for at least some of the e-mail messages, one of determining a classification of the e-mail messages by the at least one server and retrieving from the database a classification of the e-mail messages by the at least one server, the classification including a sender type and at least one message type; receiving, by the at least one server from the client device via the communications network, a request to sort the listing of e-mails by e-message classification; sorting, by the at least one server, the listing of e-mails by e-mail classification; sending, by the at least one server to a client device via a communications network, instruction to display in the one of an e-mail message listing pane or an e-mail message listing window in a graphical user interface of the client device, the sorted listing of e-mails.

In some implementations of the system, to effect the sorting the listing of e-mails by e-mail classification, the program instructions when executed by the computer processor further effect sorting the listing of e-mails, at least partially, based on a respective sender type.

In some implementations of the system, to effect the sorting the listing of e-mails by e-mail classification, the program instructions when executed by the computer processor further effect sorting the listing of e-mails, at least partially, based on a respective least one message type.

In some implementations of the system, the program instructions when executed by the computer processor further effect sorting, by the at least one server, the listing of e-mails by a priority level.

In some implementations of the system, the program instructions when executed by the computer processor further effect receiving, by the at least one server from the client device via the communications network, an indication of the priority level for each of the e-mail classifications.

In some implementations of the system, the instruction to display in the one of an e-mail message listing pane or an e-mail message listing window in a graphical user interface of the client device, the sorted listing of e-mails comprises an instruction to display the sorted listing of e-mails responsive to an indication of a user being desirous of seeing the sorted listing of e-mails.

In some implementations of the system, the program instructions when executed by the computer processor further effect appreciating, by the at least one server, the indication of the user being desirous of seeing the sorted listing of e-mails.

In some implementations of the system, the instruction to display in the one of an e-mail message listing pane or an e-mail message listing window in a graphical user interface of the client device, the sorted listing of e-mails further comprises presenting a filter for selecting at least one specific category associated with at least one of the at least some of the e-mail message within the sorted listing of e-mails.

In some implementations of the system, the program instructions when executed by the computer processor further effect responsive to a user actuating the filter indicative of at least one specific category, causing the electronic device to only display e-mail messages of the at least one specific category.

In some implementations of the system, the filter being selected only of the basis on the at least one specific category of the at least one of the at least some of the e-mail messages being displayed in the e-mail message listing pane or the e-mail message listing window.

A method of constructing a listing of e-mail messages, the method comprising: retrieving, by at least one server, information in respect of a plurality of e-mail messages from at least one database in electronic communication with the at least one server, each e-mail message including a header having a plurality of header fields and a body having content; sending, by the at least one server to a client device via a communications network, instruction to display in one of an e-mail message listing pane or an e-mail message listing window in a graphical user interface of the client device, a listing of e-mails, the listing including in respect of at least some of the e-mail messages listing information including at least some of the header fields; for a first one of the e-mail messages, one of determining a classification of the first one of the e-mail messages by the at least one server and retrieving from the database a classification of the first one of the e-mail messages by the at least one server, the classification including a sender type and at least one message type; sending, by the at least one server to the client device via the communications network, instruction to display in the listing information in respect of the first one of the e-mail messages appearing in the listing of e-mail messages a first user-selectable graphical element for causing a first function to be performed in respect of the first one of the e-mail messages, the first function being based, at least in part, on the classification of the first one of the e-mail messages.

In some implementations of the method, the method further comprises: for a second one of the e-mail messages, one of determining a classification of the second one of the e-mail messages by the at least one server and retrieving from the database a classification of the second one of the e-mail messages by the at least one server, the classification including a sender type and at least one message type, the classification of the second one of the e-mail messages differing from the classification of the first one of the e-mail messages; sending, by the at least one server to the client device via the communications network, instruction to display in the listing information in respect of the second one of the e-mail messages appearing in the listing of e-mail messages a second user-selectable graphical element for causing a second function to be performed in respect of the second one of the e-mail messages, the second function being based, at least in part, on the classification of the second one of the e-mail messages, the second function differing from the first function.

In some implementations of the method, the a first user-selectable graphical element is a widget.

In some implementations of the method, the first function to be performed in respect of the first one of the e-mail messages is further dependent on at least a portion of a content of the first one of the e-mail messages.

In some implementations of the method, the first function is an action with the at least the portion of the content of the first one of the e-mail messages.

In some implementations of the method, the action is executed directly from the listing information of e-mail messages without opening the first one of the e-mail message.

In some implementations of the method, the method further comprises prior to the retrieving, determining an indication of a respective first function for a respective one of the classification of the first one of the e-mail messages.

In some implementations of the method, the method further comprises storing the indication of the respective first function in the database.

In some implementations of the method, the first function is associated with an application displaying the listing of e-mail messages.

In some implementations of the method, the first function is associated with an application other than the one displaying the listing of e-mail messages.

According to another broad aspect of the present technology, there is provided a system for constructing a listing of e-mail messages, the system including: at least one server including a computer processor; at least one database in electronic communication with the at least one server; a non-transitory computer readable information storage medium in electronic communication with the at least one server containing program instructions that when executed by the computer processor effect: retrieving, by at least one server, information in respect of a plurality of e-mail messages from at least one database in electronic communication with the at least one server, each e-mail message including a header having a plurality of header fields and a body having content; sending, by the at least one server to a client device via a communications network, instruction to display in one of an e-mail message listing pane or an e-mail message listing window in a graphical user interface of the client device, a listing of e-mails, the listing including in respect of at least some of the e-mail messages listing information including at least some of the header fields; for a first one of the e-mail messages, one of determining a classification of the first one of the e-mail messages by the at least one server and retrieving from the database a classification of the first one of the e-mail messages by the at least one server, the classification including a sender type and at least one message type; sending, by the at least one server to the client device via the communications network, instruction to display in the listing information in respect of the first one of the e-mail messages appearing in the listing of e-mail messages a first user-selectable graphical element for causing a first function to be performed in respect of the first one of the e-mail messages, the first function being based, at least in part, on the classification of the first one of the e-mail messages.

In some implementations of the system, program instructions when executed by the computer processor further effect: for a second one of the e-mail messages, one of determining a classification of the second one of the e-mail messages by the at least one server and retrieving from the database a classification of the second one of the e-mail messages by the at least one server, the classification including a sender type and at least one message type, the classification of the second one of the e-mail messages differing from the classification of the first one of the e-mail messages; sending, by the at least one server to the client device via the communications network, instruction to display in the listing information in respect of the second one of the e-mail messages appearing in the listing of e-mail messages a second user-selectable graphical element for causing a second function to be performed in respect of the second one of the e-mail messages, the second function being based, at least in part, on the classification of the second one of the e-mail messages, the second function differing from the first function.

In some implementations of the system, the a first user-selectable graphical element is a widget.

In some implementations of the system, the first function to be performed in respect of the first one of the e-mail messages is further dependent on at least a portion of a content of the first one of the e-mail messages.

In some implementations of the system, the first function is an action with the at least the portion of the content of the first one of the e-mail messages.

In some implementations of the system, the action is executed directly from the listing information of e-mail messages without opening the first one of the e-mail message.

In some implementations of the system, program instructions when executed by the computer processor further effect prior to the retrieving, determining an indication of a respective first function for a respective one of the classification of the first one of the e-mail messages.

In some implementations of the system, program instructions when executed by the computer processor further effect storing the indication of the respective first function in the database.

In some implementations of the system, the first function is associated with an application displaying the listing of e-mail messages.

In some implementations of the system, the first function is associated with an application other than the one displaying the listing of e-mail messages.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
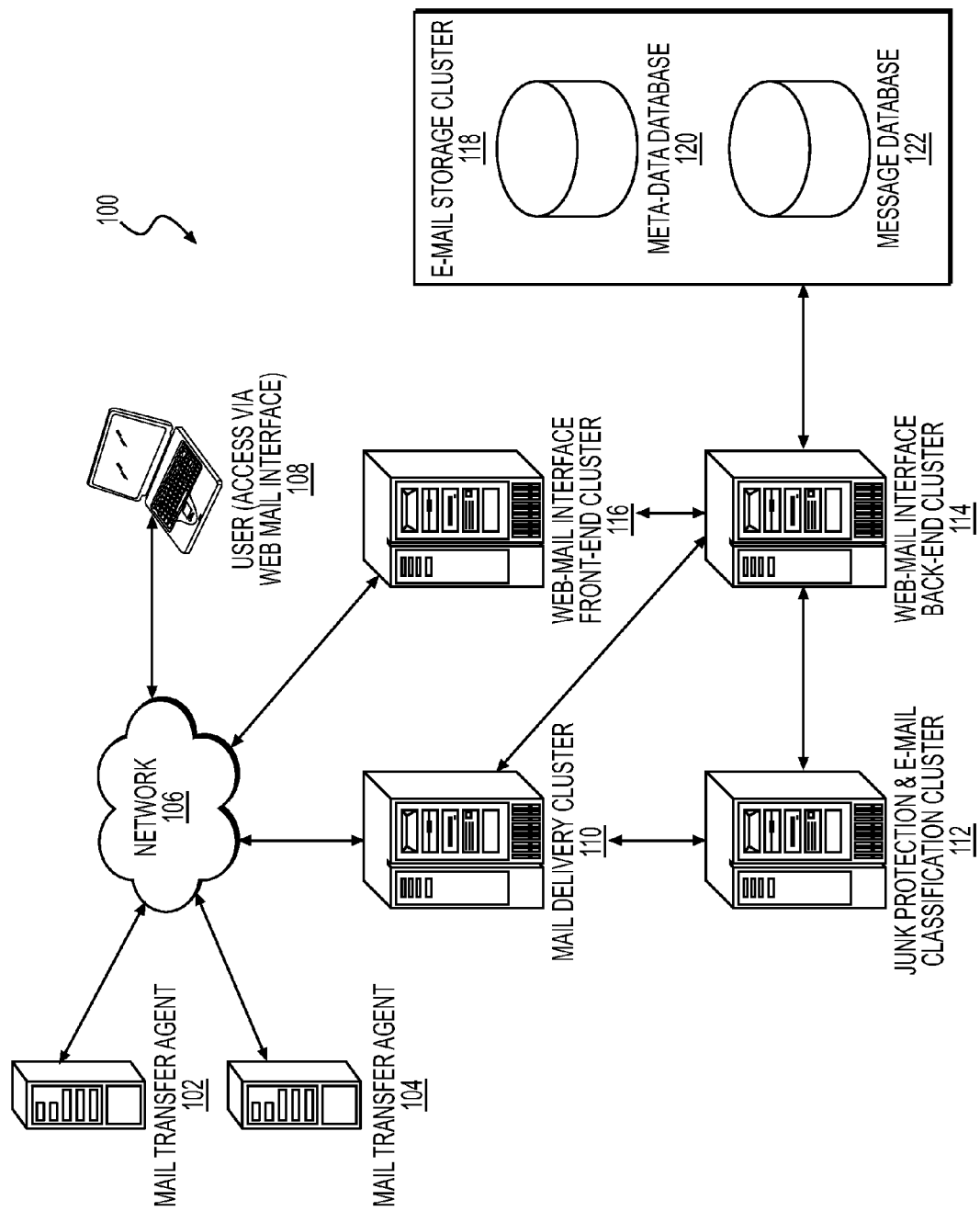
FIG. 1 is a schematic diagram of an embodiment of networked computer systems implementing the present technology.

Referring to FIG. 1, there is shown a diagram of various networked computer systems 100 in communication with one another via a communications network 106. It is to be expressly understood that the various computer systems 100 are merely some implementations of the present technology. Thus, the description thereof that follows is intended to be only a description of illustrative examples of the present technology. This description is not intended to define the scope or set forth the bounds of the present technology. In some cases, what are believed to be helpful examples of modifications to computer systems 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the computer systems 100 may provide in certain instances simple implementations of the present technology, and that where such is the case they have been presented in this manner as an aid to understanding. As persons skilled in the art would understand, various implementations of the present technology may be of a greater complexity.

The computer systems 100 shown in FIG. 1 are those that interact with a web-based mail service such as Yandex™ mail (available at mail.yandex.com). In a web-based mail system, there is typically no dedicated e-mail client on a user's computer 108. The user will typically access the mail service via a web-browser on their computer 108. The web-based mail system 100 is implemented via several clusters of servers: mail delivery server cluster 110, junk-protection and e-mail classification server cluster 112, web-mail interface back-end server cluster 114, web-mail interface front end server cluster 116, and e-mail storage server cluster 118.

In respect of the web-based mail system 100, the mail delivery server cluster 110 acts as a mail transfer agent and transfers e-mail messages to and from the mail transfer agents (e.g. 102 and 104) of other e-mail systems. The junk-protection and e-mail classification server cluster 112 implements junk e-mail filtering and e-mail message classification in respect of e-mail received by the system 100. The web-mail interface back end server cluster 114 is the main engine behind the system 100. That cluster, for example, implements all of the functions that the users of the system 100 may require, such as managing e-mail messages; managing the users' mailboxes, folders and subfolders; managing the users' e-mail account settings, etc. The web-mail interface front end server cluster 116 implements the interaction between the user's computer 108 and the web-mail interface back end server cluster 114. The e-mail storage server cluster manages the databases (meta-data database 120 and message database 122) necessary for the web mail system to function.

In one embodiment, a "pre-processing model" is implemented with regard to e-mail message classification. In a pre-processing model, e-mail is categorized prior to its being delivered to the recipient's inbox. The steps in such a model are as follows: An e-mail is sent by an external mail transfer agent 102 to the mail delivery server cluster 110. The e-mail message is received by the mail delivery server cluster 110. The mail delivery server cluster 110 processes the incoming e-mail message and sends it to the junk e-mail protection and e-mail classification server cluster 112. The junk e-mail protection and e-mail classification server cluster 112 first makes a determination whether the e-mail message is junk e-mail. If the e-mail message is junk e-mail the junk e-mail protection and e-mail classification server cluster 112 does not make a determination of a classification of the e-mail message. If the e-mail message is not junk e-mail the junk e-mail protection and e-mail classification server cluster 112 proceeds to make a determination of the e-mail message's sender type and message type(s). The e-mail message is sent by the junk e-mail protection and e-mail classification server cluster 112 to the web-mail interface back-end server cluster 114. The back-end server cluster 114 processes the e-mail message according to the determinations having been made by the junk e-mail protection and e-mail classification server cluster 112 and saves the e-mail message in the e-mail storage databases (meta-data database 120 and message database 122) which are maintained by the e-mail storage server cluster 118. (In this embodiment, the body of the message is stored in the message database 122, while the metadata related to the message is stored in meta-data database 120. The metadata includes information related to whether the e-mail is junk e-mail and the classification of the message.)

In another embodiment, a "post-processing model" is implemented with regard to e-mail message classification. In a post-processing model, e-mail is categorized after its having been delivered to the recipient's in-box (and in one embodiment only after the recipient has requested that the e-mail be opened). The steps in such a model are as follows: (1) An e-mail is sent by an external mail transfer agent 104 to the mail delivery server cluster 110. (2) The e-mail message is received by the mail delivery server cluster 110. The mail delivery server cluster 110 processes the incoming e-mail message and sends it to the web-mail interface back-end server cluster 114. The back-end server cluster 114 processes the e-mail message and saves the e-mail message in the e-mail storage databases (meta-data database 120 and message database 122) which are maintained by the e-mail storage server cluster 118. (As was the case with the previous embodiment, in this embodiment, the body of the message is stored in the message database 122, while the metadata related to the message is stored in meta-data database 120.) At some later point in time, the recipient (user) accesses the e-mail system via a browser on user's computer 108. The browser on user's computer 108 interacts with web-mail interface front-end server cluster 116, which provides the user with an interface with which the user can interface with the system. While web-mail interface front-end server cluster 116 provides the user with the interface, the actual mail data (e.g. the user's inbox message listing) is provided by the web-mail interface front-end server cluster 116 after having been received from the web-mail interface back-end server cluster 114. Web-mail interface front-end server cluster 116 thus queries web-interface back-end server cluster 114 for this data. Upon receipt of the query from the web-mail interface front-end server cluster 116, web-mail interface back-end server cluster 114, communicates with the e-mail storage server cluster 118, which retrieves the e-mail data from the meta-data database 120 and message database 122, and forwards it to the web-mail interface back-end server cluster 114. Web-mail mail interface back-end server cluster 114 receives the data and forwards it to the junk protection and e-mail classification server cluster 112. Junk protection and e-mail classification server cluster 112 makes a determination as to whether the e-mail messages having been forwarded to it are junk e-mail. For those e-mail messages that are junk e-mail no categorization takes place. For those e-mail messages that are not junk e-mail messages, the junk protection and e-mail classification server cluster 112 determines the sender type and message type(s) for each message. The determinations of the junk protection and e-mail classification server cluster 112 are then sent back the web-mail interface back-end server cluster 114 which processes the determinations made by the junk protection and e-mail classification server cluster 112 and forwards all necessary data and information to both the web-mail interface front end server cluster 116 (for display to a user) and the e-mail storage server cluster 118 for saving in the meta-data database 120 and the message database 122 as appropriate.

To illustrate the functioning of the system, by way of example several sample e-mail messages are reproduced below and the assignment of a message type to each is provided. It should be understood that these examples are merely for the purposes of illustration and have been simplified for that purpose.

Sample E-Mail 1 is reproduced below:
Sample E-mail 1
Subject: You have received a message
From: d.cathy0007@gmail.com
Date: Wed, 25 Sep 2013 15:12:14 +0300
To: *****@yandex.ua
RIA.ua
RIA.ua—All Ukrainian Ads
Add an ad "Product Search"
Hello *******"
The user d.cathy0007@gmail.com on the site RIA.ua has left you a message in response to your ad for "Samsung Notebook 300U1":
"Hello, Is this Item available for sell? Catherine"
To see your ad page please go to the following link:
http://www.ria.ua/*****.html
The user is waiting for your answer
Join us via the following social networks:
Facebook Twitter Вконтакте
Thanks for choosing our site!
This message is not Spam under the Ukraine Law No. 720 (Telecommunications)
Click here to unsubscribe.

In one embodiment, sample e-mail one would be assigned a message type of "Notification" for the following reasons:
  The link "click here to unsubscribe" contains a linked URL in the form "unsubscribe" or "opt-out".
  The character string "message" is present in the body of the e-mail.
  At least one of the following character strings: "personally", "private", "to you", "received", "for you", "you have", "unread", "new" is found in the same sentence as the character string "message" in the e-mail.
  The "Subject" header field does not contain character string "Re:" nor the character string "Fwd:"
  The message does not have a message type "BOUNCE".

The aforementioned reasoning, when converted into elementary rules (ER-EX1-#) and complex rules (CR-EX1-#) in accordance with an embodiment of the present technology would appear as follows:
  ER-EX1-1: Does the body of the message contain a link containing the character string "unsubscribe"?
  ER-EX1-2: Does the body of the message contain a link containing the character string "opt-out"?
  CR-EX1-1: Is ER-EX1 true OR is ER-EX1-2 true?
  ER-EX1-3: Does the body of the message contain the character string "message"?

ER-EX1-4: Does the message contain the character string "message" in the same sentence as the character string "personally"?
ER-EX1-5: Does the message contain the character string "message" in the same sentence as the string "private"?
ER-EX1-6: Does the message contain the character string "message" in the same sentence as the string "to you"?
ER-EX1-7: Does the message contain the character string "message" in the same sentence as the string "received"?
ER-EX1-8: Does the message contain the character string "message" in the same sentence as the string "for you"?
ER-EX1-9: Does the message contain the character string "message" in the same sentence as the string "you have"?
ER-EX1-10: Does the message contain the character string "message" in the same sentence as the character string "unread"?
ER-EX1-11: Does the message contain the character string "message" in the same sentence as the character string "new"?
CR-EX1-2: Is ER-EX1-4 true OR is ER-EX1-5 true OR is ER-EX1-6 true OR is ER-EX1-7 true OR is ER-EX1-8 true OR is ER-EX1-9 true OR is ER-EX1-10 true OR is ER-EX1-11 true?
ER-EX1-12: Does the Subject header field contain the character string "Re:"
ER-EX1-13: Does the Subject header field contain the character string "Fwd:"
CR-EX1-3: Is ER-EX1-12 true OR is ER-EX1-13 true?
ER-EX1-14: Is a message type of the message "BOUNCE"?
CR-EX1-4: Is CR-EX1-1 true AND is ER-EX1-3 true AND is CR-EX1-2 true AND is CR-EX1-3 false AND is ER-EX1-14 false?
If CR-EX1-4 is true then the message has a message type of "NOTIFICATION".
Sample E-Mail 2 is reproduced below:

Example 2

Subject: navitel.su: Confirmation of Registration
From: noreply@navitel.su
Date: Tues, 24 Sep 2013 07:50:22 +0000 (UTC)
To: *****@yandex.ru
Hello *****!
To finish the registration process and activate your account please go to the following link: http://navitel.ru/authorization/registration/?confirm=*************
Important:
You can only activate your account via the link.
Please do not reply to this message.
You have received this message only because your e-mail address was used to subscribe to www.navitel.su. If you did not subscribe to www.navitel.su please ignore this message.
Regards,
www.navitel.su Administrator.

In one embodiment, sample e-mail two would be assigned a message type of "Registration" for the following reasons:
  The Subject header field of the message contains the character string "confirmation" and the character string "registration".
  The body of the message contains the character string "activate" and the character string "account".
  At least one of the following the character strings: "support", "administration", "administrator", "technical", "service", "notification" is found in the body of the message.
  The message was sent to only one recipient.
  A message type of the message is not "NOTIFICATION".
  A message type of the message is not "BOUNCE".
  The Subject header field does not contain the character string "Re:" nor the character string "Fwd:"

The aforementioned reasoning, when converted into elementary rules (ER-EX2-#) and complex rules (CR-EX2-#) in accordance with an embodiment of the present technology would appear as follows:
ER-EX2-1: Does the Subject header field of the message contain the character string "confirmation"?
ER-EX2-2: Does the Subject header field of the message contain the character string "registration"?
CR-EX2-1: Is ER-EX2-1 true OR is ER-EX2-2 true?
ER-EX2-3: Does the body of the message contain the character string "activate"?
ER-EX2-4: Does the body of the message contain the character string "account"?
CR-EX2-2: Is ER-EX2-3 true AND is ER-EX2-4 true?
ER-EX2-5: Does the body of the message contain the character string "support"?
ER-EX2-6: Does the body of the message contain the character string "administration"?
ER-EX2-7: Does the body of the message contain the character string "administrator"?
ER-EX2-8: Does the body of the message contain the character string "technical"?
ER-EX2-9: Does the body of the message contain the character string "service"?
ER-EX2-10: Does the body of the message contain the character string "notification"?
ER-EX2-11: Does the body of the message contain the character string "support"?
CR-EX2-3: Is ER-EX2-5 true OR is ER-EX2-6 true OR is ER-EX2-7 true OR is ER-EX2-8 true OR is ER-EX2-9 true OR is ER-EX2-10 true OR is ER-EX2-11 true?
ER-EX2-12: Is the number of recipients of the message equal to 1?
ER-EX2-13: Is a message type of the message "NOTIFICATION"?
ER-EX2-14: Is a message type of the message "BOUNCE"?
ER-EX2-15: Does the Subject header field of the message contain the character string "Re:"?
ER-EX2-16: Does the Subject header field of the message contain the character string "Fwd:"?
CR-EX2-4: Is ER-EX2-1 true AND is ER-EX2-2 true?
CR-EX2-5: Is CR-EX2-1 true AND Is CR-EX2-2 true AND is CR-EX2-3 true AND is ER-EX2-12 true AND is ER-EX2-13 false AND is ER-EX2-14 false AND is CR-EX2-4 true?
If CR-EX2-5 is true the message has a message type of "REGISTRATION".
Sample E-Mail 3 is reproduced below:

Example 3

Subject: Fwd: Re: Tic
From: Alex <alev.tinall@mail.ru>
Date: Tues, 24 Sep 2013 10:36:42 +0400
To: *****@yandex.ru Attached to this e-mail is a link to the following files that have been uploaded to files@mail.ru:
1.8.pdf (64.3 MB)
Here is the link to download the files: http://files.mail.ru/
\*\*\*\*\*\*\*\*\*\*\*\*
The files will be kept until 18 Oct. 2013.
Alex In one embodiment, sample e-mail three would be assigned a message type of "People" for the following reasons:

This message was sent from a free e-mail account. Two indications of this are: (a) the From header field contains the domain name "mail.ru"—a known free mail account provider. (b) The IP address of the e-mail sender corresponds to those belonging to mail.ru.

The From header field contains the name of a person: "Alex".

The Subject header field contains at least one of "Re:" and "Fwd:"

A message type of the message is not "BOUNCE".

A message type of the message is not "NOTIFICATION".

The message does not contain the character strings "junk", "bulk", "list", "delivery", or "auto-reply".

The message does not contain the character strings "do not reply to this e-mail".

The aforementioned reasoning, when converted into elementary rules (ER-EX3-4) and complex rules (CR-EX3-4) in accordance with an embodiment of the present technology would appear as follows:

ER-EX3-1: Is domain name of sender e-mail address one of a list of known free mail account providers?

ER-EX3-2: Does the IP address of the sender correspond to the domain name of the sender's email address?

CR-EX3-1: Is ER-EX3-1 true AND is ER-EX3-2 true?

ER-EX3-3: Does the From header field of the message contain the name of a person?

ER-EX3-4: Does the Subject header field contain the character string "Re:"?

ER-EX3-5: Does the Subject header field contain the character string "Fwd:"?

CR-EX3-2 Is ER-EX3-4 true OR is ER-3-5 true?

ER-EX3-6: Is a message type of the message "BOUNCE"?

ER-EX3-7: Is a message type of the message "NOTIFICATION"?

ER-EX3-8: Does the message contain the character string "junk"?

ER-EX3-9: Does the message contain the character string "bulk"?

ER-EX3-10: Does the message contain the character string "list"?

ER-EX3-11: Does the message contain the character string "delivery"?

ER-EX3-12: Does the message contain the character string "auto-reply"?

CR-EX3-3: Is ER-EX3-8 false AND is ER-EX3-9 false AND is ER-EX3-10 false AND is ER-EX3-11 false AND Is ER-EX3-12 false?

ER-EX3-13: Does the message contain the character string "do not reply to this e-mail"?

CR-EX3-4: Is CR-EX3-1 true AND is ER-EX3-3 true AND is CR-EX3-2 true AND is CR-EX3-3 true AND is ER-EX3-13 false?

If CR-EX3-4 is true the message has a message type of "PEOPLE".

Sample E-Mail 4 is reproduced below:

Example 4

Subject: Electronic Ticket Order
From: "Sirena Travel Booking Info"<ticket@grs.sirena-travel.ru>
Date: Mon, 23 Sep 2013 11:18:52 +0800
To: "Anton"\*\*\*\*\*@yandex.ru
Dear Client,
E-Ticket No. 1234567890 has been booked in the Sirena Travel booking system in respect of your order.
A receipt and route-guide are attached.
To view the receipt and route-guide please use Adobe Acrobat Reader, which can be downloaded for free at: http://get.adobe.com/reader/
Please print the receipt and the route-map and retain them until the end of your journey. While the route-guide contains information about your ticket, it is not a boarding pass for boarding the plane. You must obtain your boarding pass at the airport.
Have a good flight.
Additional information about your trip can be found at: http://myairlines.ru.
If you have any questions please see the travel agent from whom you purchased your ticket.
Important: Please do not respond to this e-mail. It is an automated e-mail sent from an address which is not monitored for replies.
Attachment: eticket.pdf In one embodiment, sample e-mail four would be assigned a message type of "Eticket" for the following reasons:

The Subject Header field contains at least one of the following character strings: "electronic ticket", "e-ticket", "reservation", and "booking".

The message has an attachment.

A message type of the message is not "BOUNCE".

A message type of the message is not "REGISTRATION".

The message type of the message is not "NEWS".

The message does not contain the character strings "payment" or "balance" within the same sentence as the character string "due".

The aforementioned reasoning, when converted into elementary rules (ER-EX3-#) and complex rules (CR-EX3-#) in accordance with an embodiment of the present technology would appear as follows:

ER-EX4-1: Does the Subject header field contain the character string "electronic ticket"?

ER-EX4-2: Does the Subject header field contain the character string "ticket"?

ER-EX4-3: Does the Subject header field contain the character string "reservation"?

ER-EX4-4: Does the Subject header field contain the character string "booking"?

CR-EX4-1: Is ER-EX4-1 true OR is ER-EX4-2 true OR is ER-EX4-3 true OR is ER-EX4 true?

ER-EX4-4: Does the message have an attachment?

ER-EX4-5: Is a message type of the message "BOUNCE"?

ER-EX4-6: Is a message type of the message "REGISTRATION"?

ER-EX4-7: Is a message type of the message "NEWS"?

ER-EX4-8: Does the message contain the character string "payment" in the same sentence as the character string "due"?

ER-EX4-9: Does the message contain the character string "balance" in the same sentence as the character string "due"?

CR-EX4-2: Is ER-EX4-8 false AND is ER-EX4-9 false?

CR-EX4-3: Is CR-EX4-1 true AND is ER-EX4-4 true AND is ER-EX4-5 false AND is ER-EX4-6 false AND is ER-EX4-7 false and is CR-EX4-2 true?

If CR-EX4-3 is true then a message type of the message="ETICKET".

Figure 2:
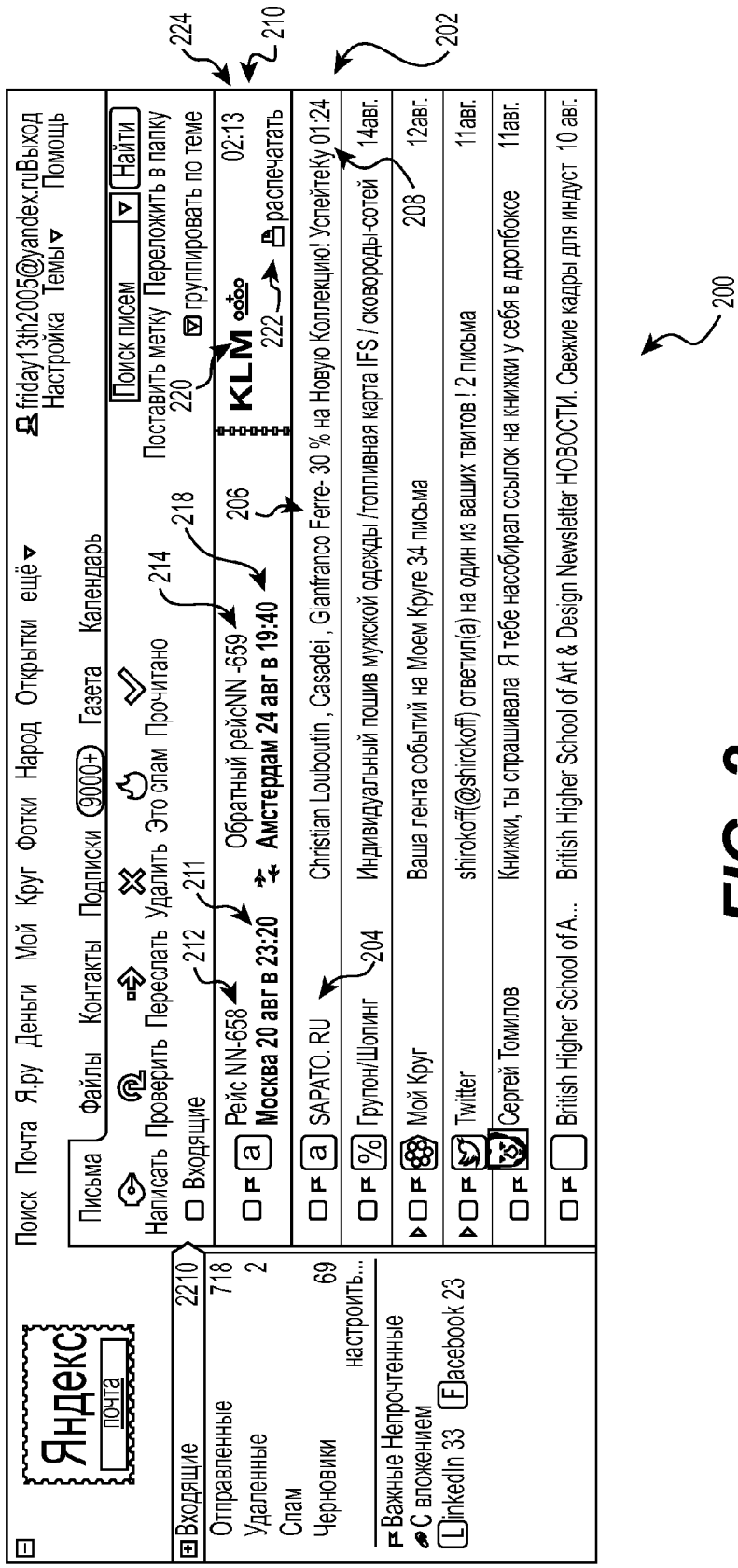
FIG. 2 is a partial screen shot of a user's inbox of the Yandex™ webmail e-mail service showing an embodiment of the present technology.

Referring to FIG. 2, there is shown a partial screen shot 200 of a user's inbox of the Yandex™ webmail e-mail service showing an embodiment of the present technology. In the inbox there is an e-mail message listing in which information about e-mails having been received is shown. Information about message 202 is shown in a conventional format using information extracted from that e-mail message's header. Thus there is shown the name 204 of the sender of e-mail message 202 (from the e-mail's From header field), the subject 206 of the e-mail message 202 (from the e-mail's Subject header field), the time 208 of e-mail message 202 (from the e-mail's Date header field).

Message 210 however is shown in non-conventional manner as the result of the present technology. A message type of message 210 has been determined to be "ticket" by the present technology. In this embodiment, information is extracted from the content of the body of the message 210 (via regular expressions, etc.) and has been presented in the e-mail message listing in a standardized format appropriate (in this embodiment) for the message type "ticket". Thus, notwithstanding the then current view (in terms of which e-mail header items are to be displayed for each e-mail item), the following information regarding message 210 is instead displayed in the e-mail message listing: the outbound flight number 212 (Flight No. NN-658); the departure city, date, and time 214 (Moscow, August 20, 11:20 pm); the return flight number 216 (Flight No, NN-659); the return city, date, and time 218 (Amsterdam, August 24, 7:40 pm). In this embodiment, information has also been extracted from an external internet resource (i.e. the airline KLM's website) in the form of the airline KLM's logo 220 and has been presented in the e-mail message 210 listing. The KLM logo 220 is also a widget in that clicking on the logo by the user will take the user to the airline KLM's website in the user's web browser. The time 224 of the e-mail message 210 (from the e-mail's Date header field) is also displayed, along with a print 222 functionality.

Figure 3:
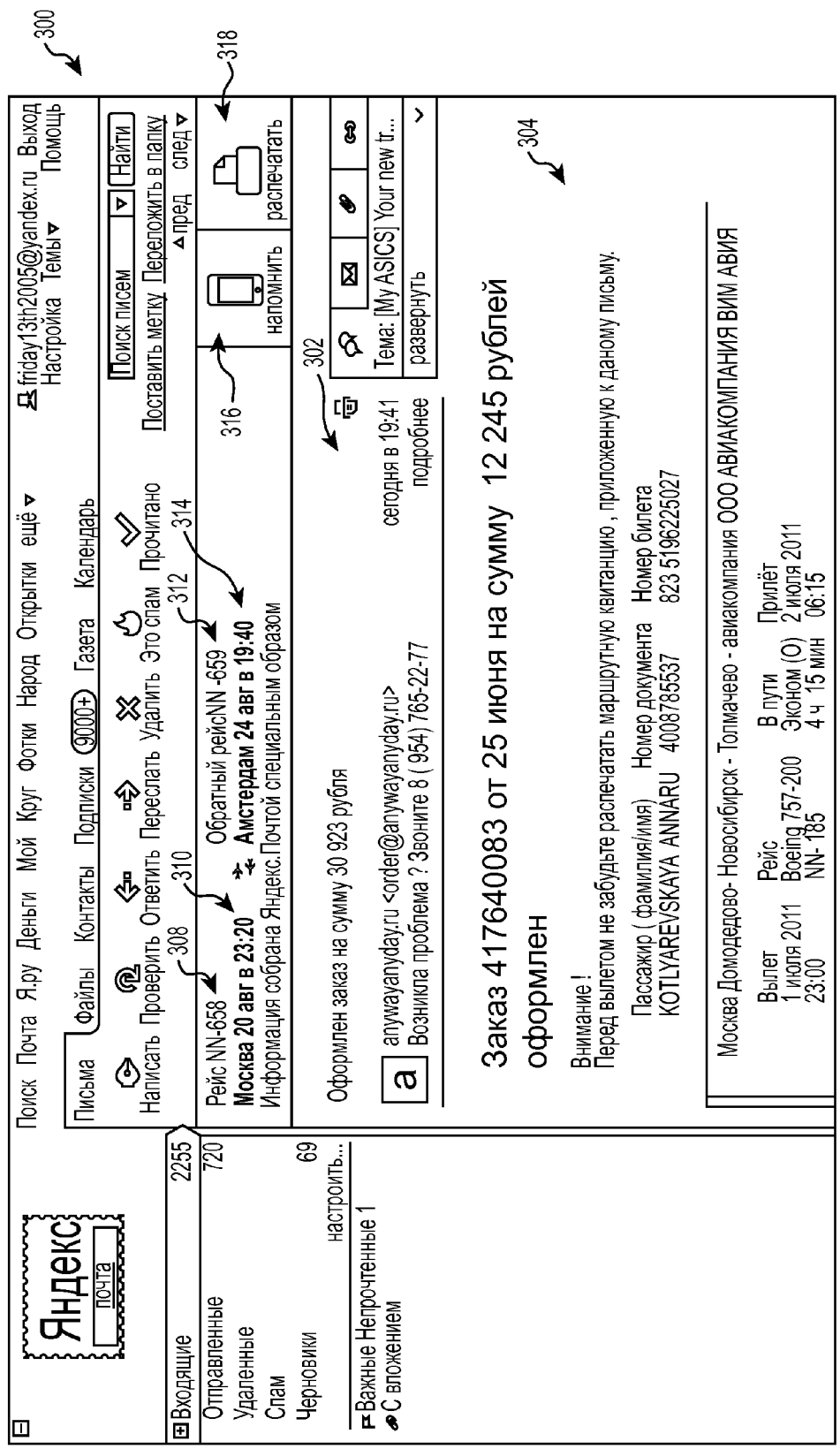
FIG. 3 is a partial screen shot of a user's email message reading pane of the Yandex webmail e-mail service showing another embodiment of the present technology.

Referring to FIG. 3, there is shown a partial screen shot 300 of a user's email message reading pane of the Yandex webmail e-mail service showing another embodiment of the present technology. In FIG. 3, the user is viewing the actual e-mail message 210 shown in FIG. 2. The e-mail viewing pane has been modified in view of the present technology. The viewing pane shows the e-mail's header information 302 and the body 304 of the e-mail. However the e-mail has also been reformatted in accordance with the present technology. In this respect, certain information has been extracted from the body 304 of the e-mail and is displayed at the top of the viewing pane in a standardized format (according to this message's message type "ticket"). In this respect, at the top of the viewing pane there is displayed the following information: the outbound flight number 308 (Flight No. NN-658); the departure city, date, and time 310 (Moscow, August 20, 11:20 pm); the return flight number 312 (Flight No, NN-659); the return city, date, and time 314 (Amsterdam, August 24, 7:40 pm). A widget 316 allowing the user to be reminded of this information (i.e. the flight information) at the appropriate times has been added, as well as printer functionality 318.

Figure 4:
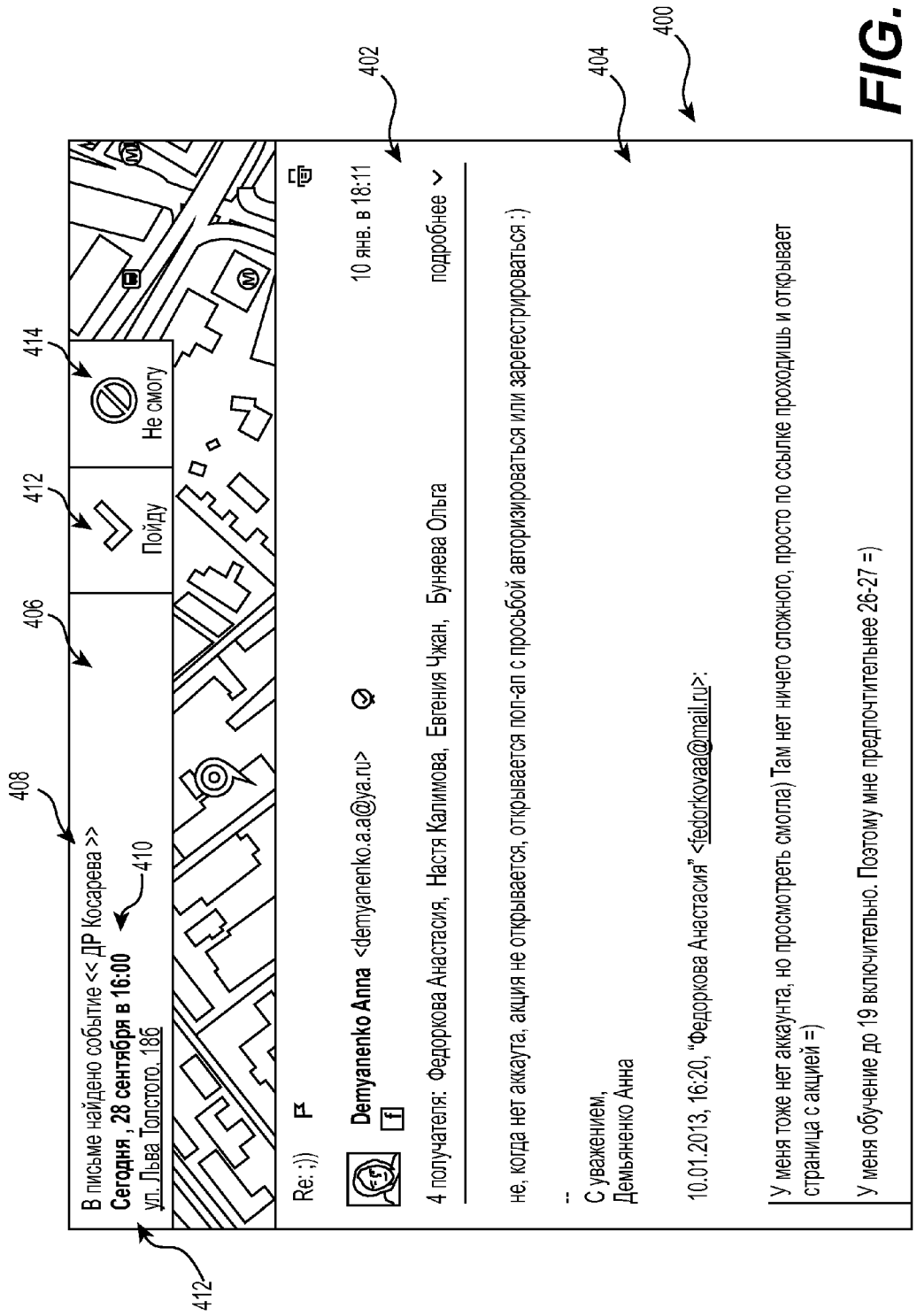
FIG. 4 is a partial screen shot of a user's email message reading pane of the Yandex webmail e-mail service showing another embodiment of the present technology.

Referring to FIG. 4, there is shown a partial screen shot 400 of a user's email message reading pane of the Yandex webmail e-mail service showing another embodiment of the present technology. The e-mail viewing pane has been modified in view of the present technology. The viewing pane shows the e-mail's header information 402 and the body 404 of the e-mail. However the e-mail has also been reformatted in accordance with the present technology. In this respect, certain information has been extracted from the body 404 of the e-mail and is displayed at the top of the viewing pane in a standardized format (according to this message's message type "invitation" and sender type "individual"). In this embodiment, the message type "invitation" is determined for the sender type "individual" when the user has been invited by an individual to an event. The e-mail system extracts information about the event to which the user has been invited (via regular expressions, etc.) from the header 402 and the body 404 of the message and provides the user with that information in a standardized format (according to this message's message type and sender type). In this respect, at the top of the viewing pane there is displayed the following information: a statement 408 that the user has been invited to an event by the sender (with the sender being named by name); the date and time 410 of the event; and the address 412 of the event. In this embodiment, response widgets 412 and 414 have also been provided to the user. Were the user to click on affirmative response widget 412, the user would be provided with a ready-to-send e-mail stating that they will attend the event (the user could modify the e-mail if they so choose to do before sending). Were the user to click on the negative response widget 414, the user would be provided with a ready-to-send negative e-mail stating that they will not attend the event (the user could modify the e-mail if they so choose to do before sending). It should be understood that the message in this case is not an e-mail event invitation in a standard form created by conventional e-mail clients. The message is simply an e-mail from one person to another asking if they would like to join them at an event.

Figure 5:
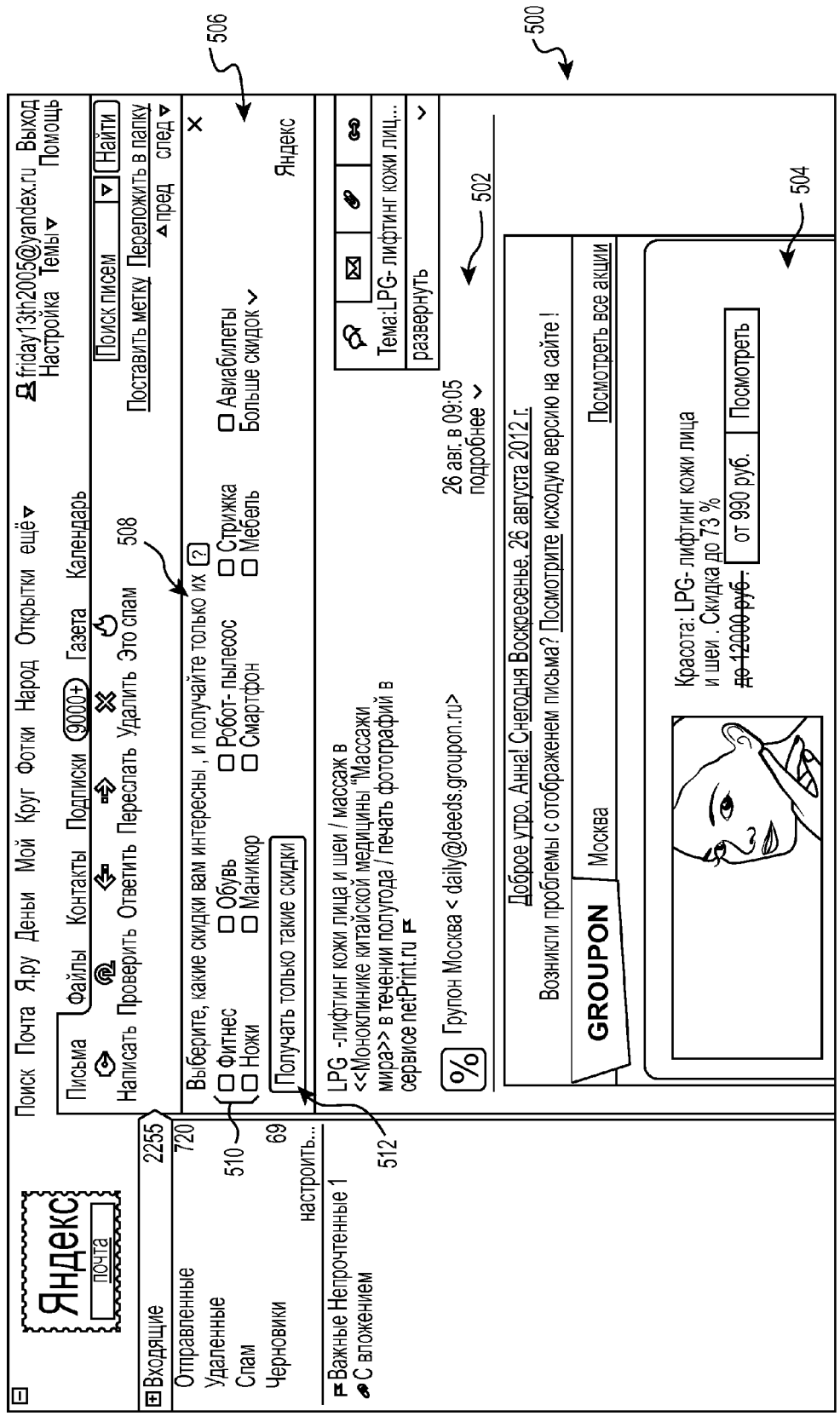
FIG. 5 is a partial screen shot of a user's email message reading pane of the Yandex webmail e-mail service showing another embodiment of the present technology.

Referring to FIG. 5, there is shown a partial screen shot 500 of a user's email message reading pane of the Yandex webmail e-mail service showing another embodiment of the present technology. The e-mail viewing pane has been modified in view of the present technology. The viewing pane shows the e-mail's header information 502 and the body 504 of the e-mail. This e-mail message is a message from the discount service Groupon™ providing the user with offers regarding certain products and/or services. (Such e-mails are a standard part of the Groupon service offering.) The e-mail has also been reformatted in accordance with the present technology. In this respect, a widget 506 is displayed at the top of the viewing pane in a standardized format (according to this message's message type "discountservice"). In this embodiment, the message type "discountservice" is determined when the user receives an e-mail from a discount service provider offering them goods and/or services for purchase.

In this embodiment, the e-mail system determines (via regular expressions, etc.) what the general category is of the particular goods and/or services being offer to the user in this particular e-mail is. (The general categories having been previously programming into the system.) The first time that the system encounters such an e-mail (of the message type "discount")—as is the case in the e-mail shown in the FIG.

5, the system provides a widget asking the user which kinds of e-mails that the user wants to see from discount services. In particular, which general categories of particular goods and/services the user wants to see e-mail about and which the user does not. In this respect, widget 506 provides user with a series of check boxes 510 each associated with general category of goods and/or services that the system is capable of identifying. The user can check the boxes 510 for those categories of goods and/or services for which they want to receive information (e.g. receive e-mails) and leave unchecked the boxes 510 for those categories of goods and/or services for which they do not want to receive information. The user then clicks a button 512 in the widget 506 and the system stores the information. From that point forward (until the user modifies their settings in this respect) the system will only place into the user's inbox e-mails from discount services (in this example) wherein the goods and/or services being offered in that particular e-mail fall within a category of goods and/or services for which the user has requested to be provided with e-mails. E-mails offering goods and/or services other than goods and/or services for which the user has requested to be provided with e-mails will automatically be placed by the system into the user's deleted items folder. In this embodiment, at any time the user chooses to do so, they may modify the system's settings by going into the settings menu, where they can check and/or uncheck boxes as they so desire. This procedure can be implemented for any number of types of services; it is not limited to discount services.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of reformatting an e-mail message having a header and a body having content in a received format, the method comprising:
   receiving, by at least one server via a communications network, the e-mail message;
   saving, by the at least one server, the e-mail message in a database in communication with the at least one server;
   receiving, by the at least one server from a client device, a request to retrieve the e-mail message;
   retrieving, by the at least one server, the e-mail message from at least one database;
   determining, by the at least one server, a classification of the e-mail message from the at least one database, the classification including a sender type and at least one message type; and
   reformatting, by the at least one server, based on the determined classification, at least some of the content of the body of the message into a predetermined format associated with the determined classification of the e-mail message, the predetermined format being retrieved from a plurality of predetermined formats associated with potential classifications of the e-mail message; and
   sending, by the at least one server to the client device, at least some of the reformatted content of the body of the message.

2. The method of claim 1, wherein the reformatting comprises at least one of adding a first image to the body of the message and deleting a second image from the body of the message.

3. The method of claim 1, wherein the reformatting comprises at least one of adding a first text to the body of the message and deleting a second text from the body of the message.

4. The method of claim 1, further comprising, prior to the receiving of the e-mail message, storing the respective predetermined format for each of the potential classifications of the e-mail message.

5. The method of claim 1, wherein the reformatting further comprises dynamically creating the predetermined format based on the determined classification of the e-mail message.

6. The method of claim 1, the e-mail message being a first e-mail message, the classification of the e-mail message being a first classification, the predetermined format being a first predetermined format, the method further comprising:
   receiving, by at least one server via a communications network, a second e-mail message;
   determining, by the at least one server, a second classification of the second e-mail message from the at least one database, the classification including a sender type and at least one message type; and
   reformatting at least some of the content of the body of the second message into a second predetermined format associated with the determined classification of the e-mail message; the second predetermined format being different from the first predetermined format.

7. The method of claim 6, further comprising determining the first predetermined format and the second pre-determined format prior to the receiving the first e-mail message.

8. The method of claim 7, further comprising storing the first predetermined format and the second predetermined format, in association with the first classification and the second classification, in the database.

9. A method of reformatting an e-mail message having a header and a body having content in a received format, the method comprising:
   receiving, by at least one server via a communications network, the e-mail message;
   determining, by the at least one server, a classification of the e-mail message from the at least one database, the classification including a sender type and at least one message type;
   reformatting, by the at least one server, based on the determined classification, at least some of the content of the body of the message into a predetermined format associated with the determined classification of the e-mail message, the predetermined format being retrieved from a plurality of predetermined formats associated with potential classifications of the e-mail message;
   saving, by the at least one server, the e-mail message including the reformatted content in a database in communication with the at least one server;
   receiving, by the at least one server from a client device, a request to retrieve the e-mail message;
   retrieving, by the at least one server, the e-mail message from at least one database; and
   sending, by the at least one server to the client device, at least some of the reformatted content of the body of the message.

10. The method of claim 9, wherein the reformatting comprises at least one of adding a first image to the body of the message and deleting a second image from the body of the message.

11. The method of claim 9, wherein the reformatting comprises at least one of adding a first text to the body of the message and deleting a second text from the body of the message.

12. The method of claim 9, further comprising, prior to the receiving of the e-mail message, storing the respective predetermined format for each of the potential classifications of the e-mail message.

13. The method of claim 9, wherein the reformatting further comprises dynamically creating the predetermined format based on the determined classification of the e-mail message.

14. The method of claim 9, the e-mail message being a first e-mail message, the classification of the e-mail message being a first classification, the predetermined format being a first predetermined format, the method further comprising:
- receiving, by at least one server via a communications network, a second e-mail message;
- determining, by the at least one server, a second classification of the second e-mail message from the at least one database, the classification including a sender type and at least one message type; and
- reformatting at least some of the content of the body of the second message into a second predetermined format associated with the determined classification of the e-mail message; the second predetermined format being different from the first predetermined format.

15. The method of claim 9, further comprising determining the first predetermined format and the second predetermined format prior to the receiving the first e-mail message.

16. The method of claim 15, further comprising storing the first predetermined format and the second predetermined format, in association with the first classification and the second classification, in the database.

17. A method of reformatting an e-mail message having a header and a body having content in a received format, the method comprising:
- receiving, by at least one server via a communications network, the e-mail message;
- determining, by the at least one server, a classification of the e-mail message from the at least one database, the classification including a sender type and at least one message type;
- saving, by the at least one server, the e-mail message and the classification of the e-mail message in a database in communication with the at least one server;
- receiving, by the at least one server from a client device, a request to retrieve the e-mail message;
- retrieving, by the at least one server, the e-mail message and the classification of the e-mail message from at least one database;
- reformatting, by the at least one server, based on the determined classification, at least some of the content of the body of the message into a predetermined format associated with the retrieved classification of the e-mail message, the predetermined format being retrieved from a plurality of predetermined formats associated with potential classifications of the e-mail message; and
- sending, by the at least one server to the client device, at least some of the reformatted content of the body of the message.

18. The method of claim 17, wherein the reformatting comprises at least one of adding a first image to the body of the message and deleting a second image from the body of the message.

19. The method of claim 17, wherein the reformatting comprises at least one of adding a first text to the body of the message and deleting a second text from the body of the message.

20. The method of claim 17, further comprising, prior to the receiving of the e-mail message, storing the respective predetermined format for each of the potential classifications of the e-mail message.

21. The method of claim 17, wherein the reformatting further comprises dynamically creating the predetermined format based on the determined classification of the e-mail message.

22. The method of claim 17, the e-mail message being a first e-mail message, the classification of the e-mail message being a first classification, the predetermined format being a first predetermined format, the method further comprising:
- receiving, by at least one server via a communications network, a second e-mail message;
- determining, by the at least one server, a second classification of the second e-mail message from the at least one database, the classification including a sender type and at least one message type; and
- reformatting at least some of the content of the body of the second message into a second predetermined format associated with the determined classification of the e-mail message; the second predetermined format being different from the first predetermined format.

23. The method of claim 22, further comprising determining the first predetermined format and the second predetermined format prior to the receiving the first e-mail message.

24. The method of claim 23, further comprising storing the first predetermined format and the second predetermined format, in association with the first classification and the second classification, in the database.

25. A system for reformatting an e-mail message having a header and a body having content in a received format, the system including:
- at least one server including a computer processor;
- at least one database in electronic communication with the at least one server;
- a non-transitory computer readable information storage medium in electronic communication with the at least one server containing program instructions that when executed by the computer processor effect:
  - receiving, by at least one server via a communications network, the e-mail message;
  - saving, by the at least one server, the e-mail message in a database in communication with the at least one server;
  - receiving, by the at least one server from a client device, a request to retrieve the e-mail message;
  - retrieving, by the at least one server, the e-mail message from at least one database;
  - determining, by the at least one server, a classification of the e-mail message from the at least one database, the classification including a sender type and at least one message type; and
  - reformatting, by the at least one server, based on the determined classification, at least some of the content of the body of the message into a predetermined format associated with the determined classification of the e-mail message, the predetermined format being retrieved from a plurality of predetermined formats associated with potential classifications of the e-mail message; and sending, by the at least one server to the client device, at least some of the reformatted content of the body of the message.

26. The system of claim 25, wherein to effect the reformatting, the program instructions further configured to effect at least one of adding a first image to the body of the message and deleting a second image from the body of the message.

27. The system of claim 25, wherein to effect the reformatting, the program instructions further configured to effect at least one of adding a first text to the body of the message and deleting a second text from the body of the message.

28. The system of claim 25, the program instructions further configured to effect, prior to the receiving of the e-mail message, storing the respective predetermined format for each of the potential classifications of the e-mail message.

29. The system of claim 25, wherein to effect the reformatting, the program instructions further configured to effect dynamically creating the predetermined format based on the determined classification of the e-mail message.

30. The system of claim 25, the e-mail message being a first e-mail message, the classification of the e-mail message being a first classification, the predetermined format being a first predetermined format, the program instructions further configured to effect:
  receiving, by at least one server via a communications network, a second e-mail message;
  determining, by the at least one server, a second classification of the second e-mail message from the at least one database, the classification including a sender type and at least one message type; and
  reformatting at least some of the content of the body of the second message into a second predetermined format associated with the determined classification of the e-mail message; the second predetermined format being different from the first predetermined format.

31. The system of claim 25, the program instructions further configured to effect determining the first predetermined format and the second pre-determined format prior to the receiving the first e-mail message.

32. The system of claim 31, the program instructions further configured to effect storing the first predetermined format and the second predetermined format, in association with the first classification and the second classification, in the database.

33. A system for reformatting an e-mail message having a header and a body having content in a received format, the system including:
  at least one server including a computer processor;
  at least one database in electronic communication with the at least one server;
  a non-transitory computer readable information storage medium in electronic communication with the at least one server containing program instructions that when executed by the computer processor effect:
    receiving, by at least one server via a communications network, the e-mail message;
    determining, by the at least one server, a classification of the e-mail message from the at least one database, the classification including a sender type and at least one message type;
    reformatting, by the at least one server, based on the determined classification, at least some of the content of the body of the message into a predetermined format associated with the determined classification of the e-mail message, the predetermined format being retrieved from a plurality of predetermined formats associated with potential classifications of the e-mail message;
    saving, by the at least one server, the e-mail message including the reformatted content in a database in communication with the at least one server;
    receiving, by the at least one server from a client device, a request to retrieve the e-mail message;
    retrieving, by the at least one server, the e-mail message from at least one database; and
    sending, by the at least one server to the client device, at least some of the reformatted content of the body of the message.

34. The system of claim 33, wherein to effect the reformatting, the program instructions further configured to effect at least one of adding a first image to the body of the message and deleting a second image from the body of the message.

35. The system of claim 33, wherein to effect the reformatting, the program instructions further configured to effect at least one of adding a first text to the body of the message and deleting a second text from the body of the message.

36. The system of claim 33, the program instructions further configured to effect, prior to the receiving of the e-mail message, storing the respective predetermined format for each of the potential classifications of the e-mail message.

37. The system of claim 33, wherein to effect the reformatting, the program instructions further configured to effect dynamically creating the predetermined format based on the determined classification of the e-mail message.

38. The system of claim 33, the e-mail message being a first e-mail message, the classification of the e-mail message being a first classification, the predetermined format being a first predetermined format, the program instructions further configured to effect:
  receiving, by at least one server via a communications network, a second e-mail message;
  determining, by the at least one server, a second classification of the second e-mail message from the at least one database, the classification including a sender type and at least one message type; and
  reformatting at least some of the content of the body of the second message into a second predetermined format associated with the determined classification of the e-mail message; the second predetermined format being different from the first predetermined format.

39. The system of claim 33, the program instructions further configured to effect determining the first predetermined format and the second pre-determined format prior to the receiving the first e-mail message.

40. The system of claim 39, the program instructions further configured to effect storing the first predetermined format and the second predetermined format, in association with the first classification and the second classification, in the database.

41. A system for reformatting an e-mail message having a header and a body having content in a received format, the system including:
  at least one server including a computer processor;
  at least one database in electronic communication with the at least one server;
  a non-transitory computer readable information storage medium in electronic communication with the at least one server containing program instructions that when executed by the computer processor effect:

receiving, by at least one server via a communications network, the e-mail message;

determining, by the at least one server, a classification of the e-mail message from the at least one database, the classification including a sender type and at least one message type;

saving, by the at least one server, the e-mail message and the classification of the e-mail message in a database in communication with the at least one server;

receiving, by the at least one server from a client device, a request to retrieve the e-mail message;

retrieving, by the at least one server, the e-mail message and the classification of the e-mail message from at least one database;

reformatting, by the at least one server, based on the determined classification, at least some of the content of the body of the message into a predetermined format associated with the retrieved classification of the e-mail message, the predetermined format being retrieved from a plurality of predetermined formats associated with potential classifications of the e-mail message; and sending, by the at least one server to the client device, at least some of the reformatted content of the body of the message.

42. The system of claim 41, wherein to effect the reformatting, the program instructions further configured to effect at least one of adding a first image to the body of the message and deleting a second image from the body of the message.

43. The system of claim 41, wherein to effect the reformatting, the program instructions further configured to effect at least one of adding a first text to the body of the message and deleting a second text from the body of the message.

44. The system of claim 41, the program instructions further configured to effect, prior to the receiving of the e-mail message, storing the respective predetermined format for each of the potential classifications of the e-mail message.

45. The system of claim 41, wherein to effect the reformatting, the program instructions further configured to effect dynamically creating the predetermined format based on the determined classification of the e-mail message.

46. The system of claim 41, the e-mail message being a first e-mail message, the classification of the e-mail message being a first classification, the predetermined format being a first predetermined format, the program instructions further configured to effect:

receiving, by at least one server via a communications network, a second e-mail message;

determining, by the at least one server, a second classification of the second e-mail message from the at least one database, the classification including a sender type and at least one message type; and reformatting at least some of the content of the body of the second message into a second predetermined format associated with the determined classification of the e-mail message; the second predetermined format being different from the first predetermined format.

47. The system of claim 41, the program instructions further configured to effect determining the first predetermined format and the second pre-determined format prior to the receiving the first e-mail message.

48. The system of claim 41, the program instructions further configured to effect storing the first predetermined format and the second predetermined format, in association with the first classification and the second classification, in the database.

* * * * *